(12) United States Patent
Zhai

(10) Patent No.: US 12,073,777 B2
(45) Date of Patent: *Aug. 27, 2024

(54) DISPLAY PANEL AND DISPLAY DEVICE

(71) Applicant: Hubei Yangtze Industrial Innovation Center Of Advanced Display Co., Ltd., Wuhan (CN)

(72) Inventor: Yingteng Zhai, Wuhan (CN)

(73) Assignee: Hubei Yangtze Industrial Innovation Center Of Advanced Display Co., Ltd., Wuhan (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/320,224

(22) Filed: May 19, 2023

(65) Prior Publication Data
US 2023/0306901 A1   Sep. 28, 2023

Related U.S. Application Data

(63) Continuation of application No. 17/659,485, filed on Apr. 17, 2022, now Pat. No. 11,694,609.

(30) Foreign Application Priority Data

Dec. 31, 2021   (CN) .......................... 202111673898.5

(51) Int. Cl.
*G09G 3/32* (2016.01)
*G09G 3/20* (2006.01)

(52) U.S. Cl.
CPC .............. *G09G 3/32* (2013.01); *G09G 3/2011* (2013.01); *G09G 3/2014* (2013.01);
(Continued)

(58) Field of Classification Search
CPC .......... G09G 3/2007–2014; G09G 3/32–3291; G09G 2300/0421–043; G09G 2300/0809;
(Continued)

(56) References Cited

U.S. PATENT DOCUMENTS

2002/0089474 A1* 7/2002 Wu ....................... G09G 3/3233
345/76
2004/0207614 A1* 10/2004 Yamashita ........... G09G 3/3258
345/211

(Continued)

FOREIGN PATENT DOCUMENTS

| CN | 110556072 A | 12/2019 |
| CN | 111477165 A | 7/2020 |
| CN | 112435625 A | 3/2021 |

*Primary Examiner* — Nathan Danielsen
(74) *Attorney, Agent, or Firm* — KILPATRICK TOWNSEND & STOCKTON LLP

(57) ABSTRACT

Provided are a display panel and a display device. The display panel includes a first light-emitting element, a second light-emitting element, a first driver circuit and a second driver circuit. The first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light.

18 Claims, 10 Drawing Sheets

(52) U.S. Cl.
CPC ............... *G09G 2300/0819* (2013.01); *G09G 2300/0852* (2013.01); *G09G 2310/0259* (2013.01); *G09G 2310/066* (2013.01); *G09G 2310/08* (2013.01); *G09G 2320/0233* (2013.01); *G09G 2320/0633* (2013.01); *G09G 2320/064* (2013.01)

(58) Field of Classification Search
CPC .... G09G 2300/0814; G09G 2300/0842–0852; G09G 2310/0243; G09G 2310/0259; G09G 2310/0262; G09G 2310/06; G09G 2310/066; G09G 2310/067; G09G 2310/08; G09G 2320/0233; G09G 2320/0242; G09G 2320/04; G09G 2320/0626–064
See application file for complete search history.

(56) References Cited

U.S. PATENT DOCUMENTS

| | | | |
|---|---|---|---|
| 2006/0022616 A1* | 2/2006 | Furukawa | G09G 3/342 315/309 |
| 2006/0170636 A1* | 8/2006 | Nakamura | G09G 3/3266 345/92 |
| 2020/0342797 A1* | 10/2020 | Zhai | G02F 1/29 |
| 2021/0142723 A1* | 5/2021 | Yamashita | G09G 3/3225 |
| 2022/0101783 A1* | 3/2022 | Han | G09G 3/32 |

* cited by examiner

DISPLAY PANEL AND DISPLAY DEVICE

CROSS-REFERENCE TO RELATED APPLICATION(S)

This is a continuation application of U.S. patent application Ser. No. 17/659,485, filed on Apr. 17, 2022, which claims priority to Chinese Patent Application No. 202111673898.5 filed Dec. 31, 2021, the disclosures of which are incorporated herein by reference in their entirety.

FIELD

Embodiments of the present disclosure relate to the field of display technology and, in particular, to a display panel and a display device.

BACKGROUND

At present, display panels are widely applied to electronic devices such as mobile phones, tablet computers, smart wearable devices and information query machines. The display panel includes a light-emitting element and a driver circuit coupled to the light-emitting element. The driver circuit drives the light-emitting element to emit light. Generally, the light-emitting element achieves the full color display of the display panel through red, green and blue sub-pixels which are mixed into any other color.

However, in an existing display panel, pixel driving is designed unreasonably, drive currents required by light-emitting elements of different colors have significant differences especially at a highest grayscale and are outputted with different accuracies, and brightness output is unstable. Therefore, the display panel has relatively poor display uniformity, which affects the quality and user experience of the display panel.

SUMMARY

The present disclosure provides a display panel and a display device to ensure uniform brightness of light-emitting elements at the same grayscale, improve the output accuracy of a current, and ensure display uniformity.

In the embodiments of the present disclosure provide a display panel. The display panel includes a first light-emitting element, a second light-emitting element, a first driver circuit and a second driver circuit.

The first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light.

Each of the first driver circuit and the second driver circuit comprises a pulse-amplitude modulation circuit and a pulse-width modulation circuit; where the pulse-amplitude modulation circuit of the first driver circuit is configured to control an amplitude of the first drive current based on an applied pulse-amplitude modulation data voltage Vdata_PAM, and the pulse-width modulation circuit of the first driver circuit is configured to control a pulse width of the first drive current based on an applied pulse-width modulation data voltage Vdata_PWM and a sweep signal V_SWEEP; the pulse-amplitude modulation circuit of the second driver circuit is configured to control an amplitude of the second drive current based on an applied pulse-amplitude modulation data voltage Vdata_PAM, and the pulse-width modulation circuit of the second driver circuit is configured to control a pulse width of the second drive current based on an applied pulse-width modulation data voltage Vdata_PWM and a sweep signal V_SWEEP.

The pulse-amplitude modulation circuit in the first driver circuit is configured with a pulse-amplitude modulation data voltage Vdata_PAM (1) and the pulse-amplitude modulation circuit in the second driver circuit is configured with a pulse-amplitude modulation data voltage Vdata_PAM (2), and Vdata_PAM (1) and Vdata_PAM (1) are different.

In the embodiments of the present disclosure further provide a display device. The display device includes any display panel according to the embodiments.

DETAILED DESCRIPTION

Figure 1:
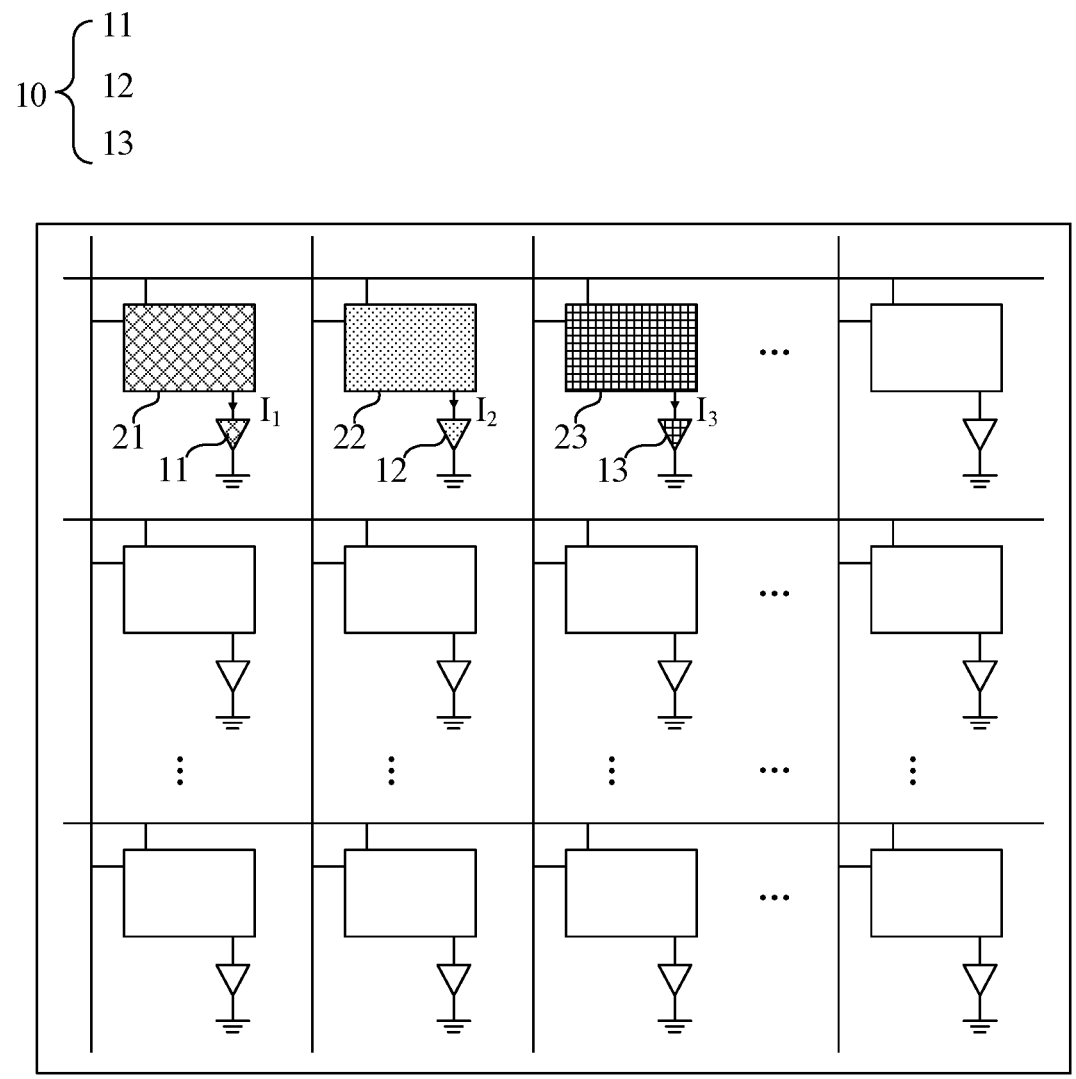
FIG. 1 is a structure diagram of a display panel according to an embodiment of the present disclosure.

The present disclosure is further described hereinafter in detail in conjunction with drawings and embodiments. It is to be understood that the embodiments described herein are intended to explain the present disclosure and not to limit the present disclosure. Additionally, it is to be noted that for ease of description, only part, not all, of structures related to the present disclosure are illustrated in the drawings.

As described in BACKGROUND, using a micro light-emitting diode (micro-LED) display panel as an example, micro-LED elements of different colors in an existing display panel use different luminescent materials and may also have different structures. Affected by the different materials and the different structures, the micro-LED elements may have different electrical characteristics, that is, the micro- LED elements of different colors may have different luminescence efficiency and different brightness when driven by the same current.

Light-emitting elements of different colors constituting one pixel unit in a display panel use the same driver circuit structure and the same control signal currently.

The light-emitting elements of different colors have different luminescence efficiency and different brightness contributions in the same pixel, for example, when white light is emitted, the light-emitting elements of different colors have different brightness and different light-emitting elements require different average drive currents. Therefore, during actual driving, the light-emitting elements have inaccurate brightness display and unstable pixel grayscales and the display panel has poor display uniformity and poor accuracy, affecting a display effect.

Based on the above problems, embodiments of the present disclosure provide a display panel. The display panel includes a first light-emitting element, a second light-emitting element, a first driver circuit and a second driver circuit. The first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light. At least at a maximum grayscale, an average current value of the first drive current is greater than an average current value of the second drive current.

In the embodiments of the present disclosure, the first light-emitting element and the second light-emitting element and the first driver circuit and the second driver circuit corresponding to the two light-emitting elements are disposed in the display panel and at the maximum grayscale, an average current provided by one driver circuit to the corresponding light-emitting element is greater/less than an average current provided by the other driver circuit to the corresponding light-emitting element. Since the two light-emitting elements in the display panel have different electrical characteristics and different luminescence efficiency, the driver circuit provides a relatively large average current value to the light-emitting element which has relatively low luminescence efficiency and requires a relatively large average drive current, and the driver circuit provides a relatively small average current value to the light-emitting element which has relatively high luminescence efficiency and requires a relatively small average drive current, to meet the requirements of the light-emitting elements for the drive currents and ensure that the driver circuits adapt to the characteristics in luminescence efficiency of different light-emitting elements and provide more accurate average drive currents. Therefore, the light-emitting elements are prevented from unstable brightness output, non-uniform display brightness, a relatively poor display effect and the like.

The embodiments of the present disclosure are described clearly and completely below in conjunction with the drawings in embodiments of the present disclosure. Apparently, the embodiments described below are part, not all, of embodiments of the present disclosure.

FIG. 1 is a structure diagram of a display panel according to an embodiment of the present disclosure. Referring to FIG. 1, light-emitting elements 10 in the display panel include a first light-emitting element 11 and a second light-emitting element 12, and the display panel further includes a first driver circuit 21 and a second driver circuit 22. The first driver circuit 21 is electrically connected to the first light-emitting element 11 and configured to provide a first drive current $I_1$ to the first light-emitting element 11 to control the first light-emitting element 11 to emit light, and the second driver circuit 22 is electrically connected to the second light-emitting element 12 and configured to provide a second drive current $I_2$ to the second light-emitting element 12 to control the second light-emitting element 12 to emit light. At least at a maximum grayscale, an average current value $I_1\_ave$ of the first drive current $I_1$ is greater than an average current value $I_2\_ave$ of the second drive current $I_2$.

The first light-emitting element 11 and the second light-emitting element 12 mainly represent two light-emitting elements of different colors which have different luminescence efficiency due to different luminescent materials, different element structures and the like. The first light-emitting element 11 has lower luminescence efficiency than the second light-emitting element 12. The first driver circuit 21 and the second driver circuit 22 represent the driver circuits which drive the first light-emitting element 11 and the second light-emitting element 12 to emit light, respectively. The first driver circuit 21 and the second driver circuit 22 may have the same circuit structure and the same driving principle. A difference between the two driver circuits includes different control signals corresponding to the two driver circuits. The two driver circuits provide suitable average drive currents to the two light-emitting elements, respectively by use of the different control signals, to satisfy that at least at the maximum grayscale, the average current value of the first drive current is greater than the average current value of the second drive current.

The brightness of the light-emitting element (11/12) is jointly determined by an amplitude of the drive current and a light emission duration. The process of the first driver circuit 21 and the second driver circuit 22 driving the light-emitting elements to emit light is the process of the first driver circuit 21 and the second driver circuit 22 controlling the light-emitting elements to emit light at specific drive currents within effective light emission durations in an image display cycle (a period of one frame), to control the brightness of the light-emitting elements and the grayscale of a pixel.

The average current value may be understood as an equivalent drive current within the period of one frame. A calculation formula of the average current value is $I\_ave = I\_pam * t\_pwm / t\_frame$, where $I\_pam$ denotes a current value of an output drive current pulse (the amplitude of the drive current), which is determined by a pulse-amplitude modulation data voltage Vdata_PAM; $t\_pwm$ denotes a duration of a current in each frame (a pulse width of the drive current), which is determined by a sweep signal V_SWEEP and a pulse-width modulation data voltage Vdata_PWM; and $t\_frame$ denotes time at which a pixel is driven in one frame. According to the calculation formula of the average current value, the larger the average current value, the longer the effective light emission duration of the light-emitting element within the period of one frame, and/or the higher the amplitude of the drive current.

Therefore, for the two light-emitting elements with different luminescence efficiency, their driver circuits are configured to provide different average drive currents in the embodiment of the present disclosure, that is, the driver circuit provides a relatively large average current value to the light-emitting element which has relatively low luminescence efficiency and requires a relatively large average drive current, and the driver circuit provides a relatively small average current value to the light-emitting element which has relatively high luminescence efficiency and requires a relatively small average drive current, to meet the requirements of the light-emitting elements for the drive currents and ensure that the driver circuits adapt to luminescence characteristics of different light-emitting elements and provide more accurate drive currents. Therefore, the light-emitting elements are prevented from unstable brightness output, non-uniform display brightness, a relatively poor display effect and the like.

It is to be noted that in the embodiment of the present disclosure, the light-emitting elements 10 in the display panel may include not only the two light-emitting elements. For example, the light-emitting elements 10 may include a red light-emitting element, a green light-emitting element and a blue light-emitting element, and for any two light-emitting elements having different luminescence efficiency, suitable drive currents are provided to adjust a relationship in magnitude between average current values of the drive currents. In an embodiment, the light-emitting element 10 may be a micro-LED, a mini-LED, a nano-LED, a quantum dot light-emitting diode (QLED) or the like, which is not limited here.

In an embodiment, implementations are provided in the embodiment of the present disclosure for different light-emitting elements having different luminescence efficiency, to achieve that at least at the maximum grayscale, the average current value of the first drive current is greater than the average current value of the second drive current. Implementations are described in detail below.

Figure 2:
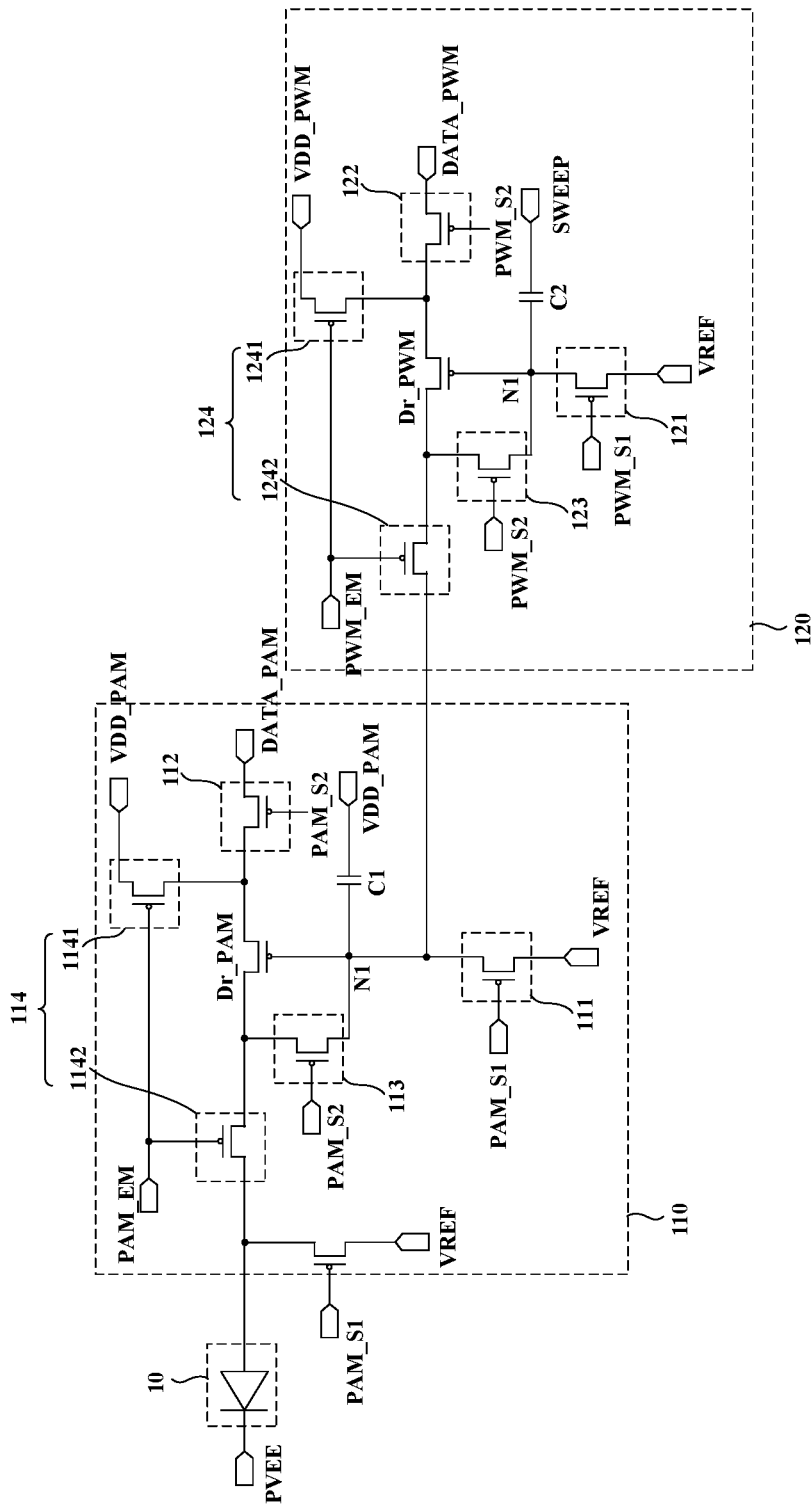
FIG. 2 is a structure diagram of a first driver circuit and a second driver circuit in the display panel shown in FIG. 1.

FIG. 2 is a structure diagram of a first driver circuit and a second driver circuit in the display panel shown in FIG. 1. Referring to FIG. 2, for example, the driver circuit in the embodiment of the present disclosure includes a pulse-amplitude modulation (PAM) circuit 110 and a pulse-width modulation (PWM) circuit 120, where the PAM circuit 110 is configured to control the amplitude of the drive current based on the applied pulse-amplitude modulation data voltage Vdata_PAM, and the PWM circuit 120 is configured to control the pulse width of the drive current based on the applied pulse-width modulation data voltage Vdata_PWM and the sweep signal V_SWEEP, where the sweep signal V_SWEEP may be a ramp signal.

In an embodiment, each of the PAM circuit 110 and the PWM circuit 120 includes an initialization unit 111/121, a data write unit 112/122, a threshold compensation unit 113/123, a light emission control unit 114/124, a storage capacitor C1/C2 and a drive transistor Dr_PAM/Dr_PWM (where the PAM circuit 110 includes the initialization unit 111, the data write unit 112, the threshold compensation unit 113, the light emission control unit 114, the storage capacitor C1 and the drive transistor Dr_PAM, and the PWM circuit 120 includes the initialization unit 121, the data write unit 122, the threshold compensation unit 123, the light emission control unit 124, the storage capacitor C2 and the drive transistor Dr_PWM). The initialization unit 111/121 is electrically connected between an initialization signal terminal VREF and a first node N1, and the initialization unit 111/121 is configured to provide an initialization signal from the initialization signal terminal VREF to the first node N1 at an initialization stage (the initialization signal provided by the initialization signal terminal VREF of the PAM circuit 110 and the initialization signal provided by the initialization signal terminal VREF of the PWM circuit 120 may have the same value or different values). The data write unit 112/122 is electrically connected between a data signal terminal DATA_PAM/DATA_PWM and a first electrode of the drive transistor Dr_PAM/Dr_PWM. A gate of the drive transistor Dr_PAM/Dr_PWM and a first plate of the storage capacitor C1/C2 are electrically connected to the first node N1, and the data write unit 112/122 is configured to provide a data voltage signal from the data signal terminal DATA_PAM/ DATA_PWM to the first node N1 through the drive transistor Dr_PAM/Dr_PWM at a data write stage. The threshold compensation unit 113/123 is electrically connected between a second electrode of the drive transistor Dr_PAM/ Dr_PWM and the first node N1, and the threshold compensation unit 113/123 is configured to provide a threshold voltage Vth of the drive transistor Dr_PAM/Dr_PWM to the first node N1 for compensation.

In the PWM circuit 120, a second plate of the storage capacitor C2 is electrically connected to a sweep signal terminal SWEEP that receives the sweep signal V_SWEEP. The light emission control unit 124 is electrically connected between a power signal terminal VDD_PWM and the first node N1 in the PAM circuit 110 and configured to control, at a light emission stage, the drive transistor Dr_PWM to generate a driving pulse. The power signal terminal VDD_PWM receives a second power voltage VDD_PWM (here, the signal terminal and the signal provided by the signal terminal are represented by the same characters), and the data signal terminal DATA_PWM receives the pulse-width modulation data voltage Vdata_PWM.

In the PAM circuit 110, a second plate of the storage capacitor C1 is electrically connected to a power signal terminal VDD_PAM that receives a first power voltage VDD_PAM (here, the signal terminal and the signal provided by the signal terminal are represented by the same characters). The light emission control unit 114 is electrically connected between the power signal terminal VDD_PAM and the light-emitting element 10, and the light emission control unit 114 is configured to control, at the light emission stage, the drive transistor Dr_PAM to generate the drive current which flows into the light-emitting element 10 to drive the light-emitting element 10 to emit light. The data signal terminal DATA_PAM receives the pulse-amplitude modulation data voltage Vdata_PAM.

The driver circuit structure shown in FIG. 2 is one embodiment of the present disclosure and is not to limit the driver circuit of the display panel. For example, each of the PAM circuit 110 and the PWM circuit 120 shown in FIG. 2 includes the threshold compensation unit configured to provide the threshold voltage of the drive transistor to compensate for a data signal when the data signal is written into the circuit, to ensure that the drive transistor provides an accurate drive current and avoids an effect of the threshold voltage of the drive transistor during data write. The embodiment of the present disclosure is also applied to a driver circuit structure in which the threshold compensation unit is not disposed. For example, the PAM circuit 110 and the PWM circuit 120 shown in FIG. 2 are adjusted as follows: the threshold compensation unit 113/123 is removed and a connection manner of the data write unit 112/122 is adjusted as follows: the data write unit 112/122 is connected between the data signal terminal DATA_PAM/ DATA_PWM and the gate of the drive transistor Dr_PAM/ Dr_PWM and configured to provide the data voltage signal from the data signal terminal DATA_PAM/DATA_PWM to the first node N1 through the data write unit 112/122 at the data write stage.

Figure 3:
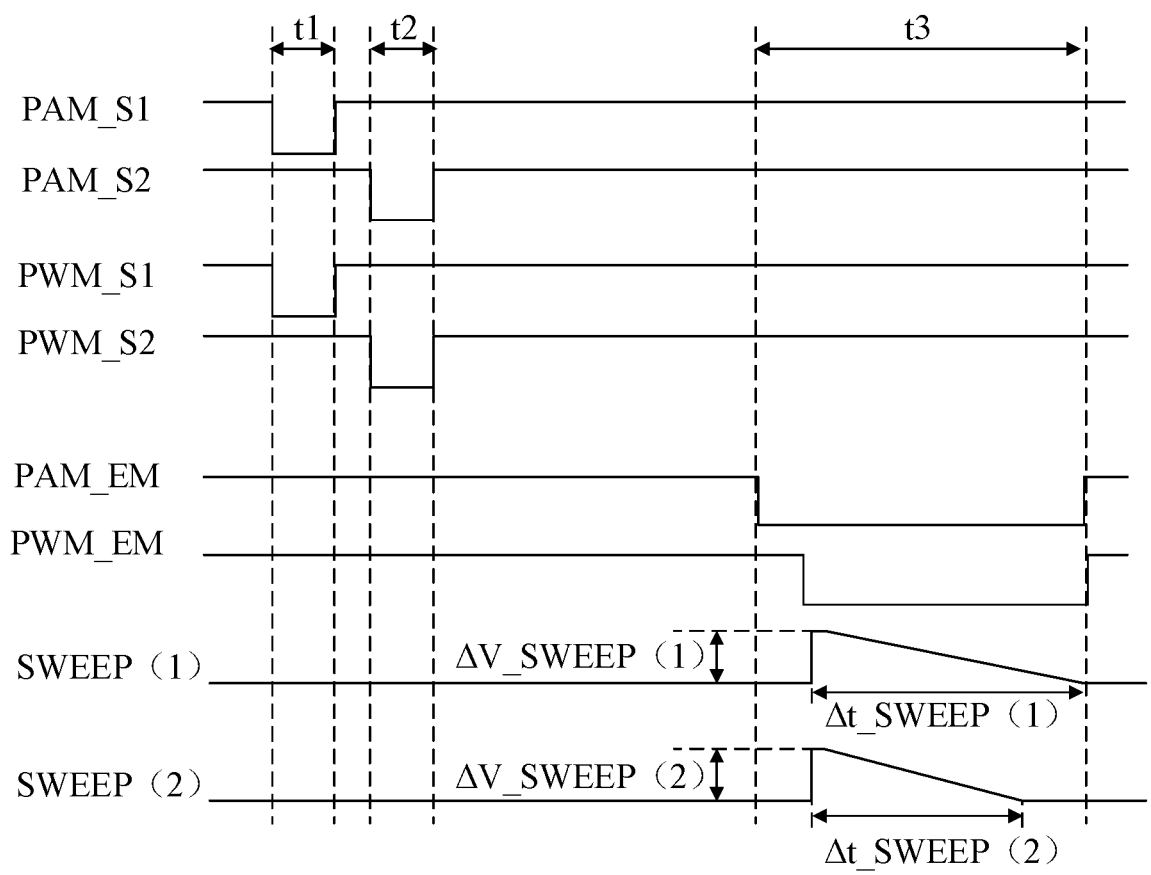
FIG. 3 is a driver circuit timing diagram of a first driver circuit and a second driver circuit according to an embodiment of the present disclosure.

FIG. 3 is a driver circuit timing diagram of a first driver circuit and a second driver circuit according to an embodiment of the present disclosure. Referring to FIGS. 2 and 3, the driving process and principle of the display panel in the embodiment of the present disclosure are described below.

The average current value I_ave which drives the light-emitting element 10 satisfies that I_ave=I_pam*t_pwm/t_frame. According to the driver circuit and the formula of the current, in the case where the frame duration t_frame is equal, the average current value I_ave is jointly determined by the amplitude I_pam of the drive current and the pulse width t_pwm of the drive current. The amplitude I_pam of the drive current is controlled by the pulse-amplitude modulation data voltage Vdata_PAM, and the pulse width t_pwm of the drive current is controlled by the pulse-width modulation data voltage Vdata_PWM and the sweep signal V_SWEEP.

In an embodiment, the above pulse width t_pwm of the drive current satisfies the following formula:

$$t\_pwm = \Delta t\_SWEEP \times (Vdata\_PWM + \Delta V\_SWEEP - PWM\_VDD)/\Delta V\_SWEEP.$$

Δt_SWEEP denotes a duration within which the sweep signal V_SWEEP changes, that is, a duration of the ramp signal, ΔV_SWEEP denotes a maximum voltage difference of the sweep signal V_SWEEP, and PWM_VDD denotes the power voltage of the PWM circuit 120. The essence of the formula, in other words, the essence of the working principle of the above driver circuit, is to set up a reference voltage (for example, the second power voltage VDD_PWM provided by the power signal terminal VDD_PWM in FIG. 2) at a source of the drive transistor Dr_PWM in the PWM circuit 120 and to form a varying potential at the gate of the drive transistor Dr_PWM through the pulse-width modulation data voltage Vdata_PWM and the ramp signal V_SWEEP. In the case where a voltage difference between the gate and the source of the drive transistor Dr_PWM is greater than the threshold voltage Vth of the drive transistor Dr_PWM, the drive transistor Dr_PWM is off. At this time, the PWM circuit 120 does not provide the control signal to the PAM circuit 110, and the drive transistor Dr_PAM in the PAM circuit 110 provides the drive current to the light-emitting element 10 according to the pulse-amplitude modulation data voltage Vdata_PAM. As a voltage of the sweep signal V_SWEEP changes, the potential at the gate of the drive transistor Dr_PWM changes synchronously until the voltage difference between the gate and the source of the drive transistor Dr_PWM is equal to (or less than) the threshold voltage Vth of the drive transistor Dr_PWM. Then, the drive transistor Dr_PWM is turned on and transmits the second power voltage VDD_PWM as a cutoff voltage to the PAM circuit 110 and the drive transistor Dr_PAM in the PAM circuit 110 is turned off and stops providing the drive current to the light-emitting element 10. Therefore, the PWM circuit 120 may provide a PWM control signal to the PAM circuit 110 and adjusts a duty cycle of PWM to control a duration within which the PAM circuit 110 outputs an effective drive current, to change the effective light emission duration of the light-emitting element 10 in the period of one frame and further controlling the brightness of the light-emitting element 10 and the grayscale of the pixel.

It is to be noted that if the driver circuit is not provided with the threshold compensation unit and the data signal is directly provided to the gate of the drive transistor Dr_PWM, the above formula is adjusted as follows:

$$t\_pwm = \Delta t\_SWEEP \times (Vdata\_PWM + \Delta V\_SWEEP - Vth\_pwm - PWM\_VDD)/\Delta V\_SWEEP.$$

Δt_SWEEP denotes a duration within which the sweep signal V_SWEEP changes, that is, a duration of the ramp signal, ΔV_SWEEP denotes a maximum voltage difference of the sweep signal V_SWEEP, and PWM_VDD denotes the power voltage of the PWM circuit 120. Vth_pwm denotes the threshold voltage of the drive transistor in the PWM circuit 120.

In the driver circuit shown in FIG. 2, the light emission control unit 114/124 includes two sub-units. In the PAM circuit 110, the light emission control unit 114 includes a first light emission control unit 1141 and a second light emission control unit 1142. In the PWM circuit 120, the light emission control unit 124 includes a first light emission control unit 1241 and a second light emission control unit 1242. In one embodiment, each of the initialization unit, the data write unit, the threshold compensation unit and the light emission control sub-unit includes one transistor. In some embodiments, a design of a double-gate transistor instead of a single-gate transistor based on a design for reducing a leakage current. For example, the initialization unit and the threshold compensation unit are each provided with the double-gate transistor, which is not limited here.

As shown in FIG. 2, each transistor is a p-type transistor. The p-type transistor may be a low-temperature polysilicon thin-film transistor (LTPS-TFT), and a material of an active layer of the LTPS-TFT includes silicon.

In another implementation, some transistors in the PAM circuit 110 and the PWM circuit 120 are p-type transistors, and the remaining transistors are n-type transistors. For example, the transistors in the initialization unit and the threshold compensation unit in the PAM circuit 110 and/or the PWM circuit 120 are the n-type transistors. The p-type transistor may be the LTPS-TFT, and the material of the active layer of the LTPS-TFT includes silicon. The n-type transistor may be an oxide semiconductor thin-film transistor (oxide-TFT), and a material of an active layer of the oxide-TFT includes an oxide semiconductor, for example, indium gallium zinc oxide (IGZO).

In another implementation, all transistors in the PAM circuit 110 and the PWM circuit 120 may be the n-type transistors. The n-type transistor may be the LTPS-TFT or the oxide-TFT.

In addition, referring to the driver circuit timing diagram shown in FIG. 3, using an example in which the transistors are the p-type transistors, a low-level period of each signal is an effective level period. In the PAM circuit 110 and the PWM circuit 120, a first scan signal PAM_S1 and a first scan signal PWM_S1 control the initialization units to turn on to initialize the nodes N1. A second scan signal PAM_S2 and a second scan signal PWM_S2 control the data write units and the threshold compensation units to turn on to charge the capacitor C1 and the capacitor C2, separately write the data signals to the nodes N1, and compensate for the data signals with the threshold voltages of the drive transistors. A light emission control signal PAM_EM and a light emission control signal PWM_EM control the light emission control units to turn on to ensure that the drive transistors are turned on and control, according to the PWM circuit 120, the PAM circuit 110 to output the drive current to the light-emitting element 10. As shown in FIG. 3, according to the effective level stages of the first scan signal PAM_S1, the first scan signal PWM_S1, the second scan signal PAM_S2, the second scan signal PWM_S2, the light emission control signal PAM_EM and the light emission control signal PWM_EM, the pixel driving process may include an initialization stage t1, a data write and threshold compensation stage t2 and a light emission stage t3. It is to be noted that the light emission stage t3 here does not refer to a stage in which the light-emitting element 10 effectively emits light.

The light emission stage t3 may be understood as the effective level stages of the light emission control signal PAM_EM and the light emission control signal PWM_EM. At the light emission stage t3, based on the pulse-width modulation data voltage Vdata_PWM of the PWM circuit 120, the PWM circuit 120 is controlled by the sweep signal V_SWEEP to provide the PWM control signal to the PAM circuit 110 and the light-emitting elements 10 are adjusted to have different light emission durations and achieve different grayscales.

For the light emission control signal PAM_EM of the PAM circuit 110 and the light emission control signal PWM_EM of the PWM circuit 120, in one implementation, the light emission control signal PAM_EM and the light emission control signal PWM_EM may be the same light emission control signal, to control the light emission control unit 114 in the PAM circuit 110 and the light emission control unit 124 in the PWM circuit 120 to turn on simultaneously. In another implementation, the light emission control signal PAM_EM and the light emission control signal PWM_EM may be different light emission control signals. For example, the two light emission control signals may have different start times. In an embodiment, the start time of the effective level stage of the light emission control signal PAM_EM of the PAM circuit 110 is earlier than the start time of the effective level stage of the light emission control signal PWM_EM of the PWM circuit 120, as shown in FIG. 3, or the start time of the effective level stage of the light emission control signal PAM_EM of the PAM circuit 110 is later than the start time of the effective level stage of the light emission control signal PWM_EM of the PWM circuit 120. For example, the effective level stages of the two light emission control signals may have different durations. In an embodiment, the duration of the effective level stage of the light emission control signal PAM_EM of the PAM circuit 110 is longer than the duration of the effective level stage of the light emission control signal PWM_EM of the PWM circuit 120, or the duration of the effective level stage of the light emission control signal PAM_EM of the PAM circuit 110 is shorter than the duration of the effective level stage of the light emission control signal PWM_EM of the PWM circuit 120. For the sweep signal V_SWEEP, a signal variation stage of the sweep signal V_SWEEP and the effective level stage of the light emission control signal PWM_EM of the PWM circuit 120 may have the same start time, or the start time of the signal variation stage of the sweep signal V_SWEEP may be later than the start time of the effective level stage of the light emission control signal PWM_EM of the PWM circuit 120.

Figure 4:
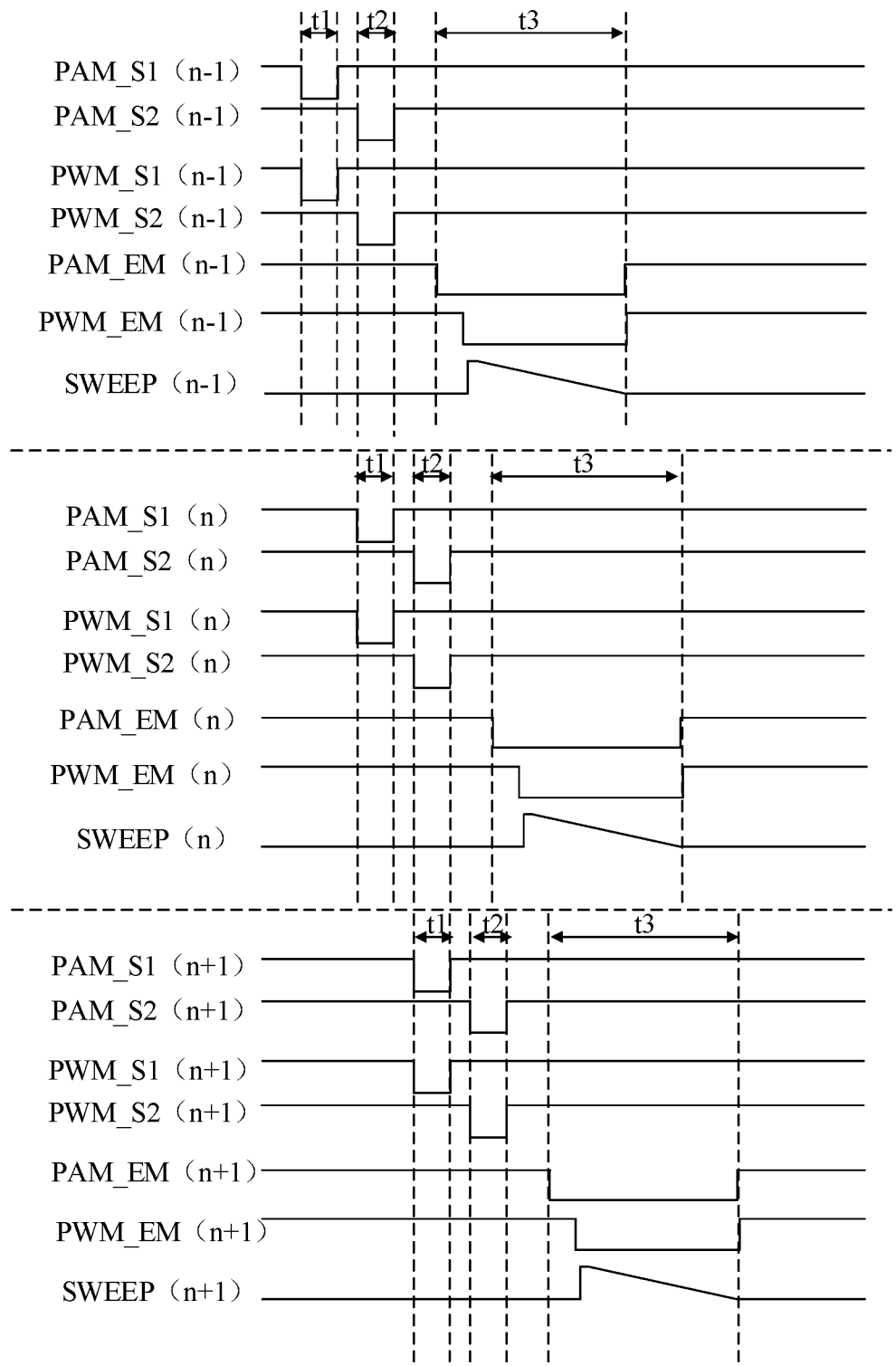
FIGS. 4 and 5 are row scan timing diagrams of a display panel according to an embodiment of the present disclosure.

As shown in FIG. 4, in the embodiment of the present disclosure, for rows of light-emitting elements in the display panel, the light emission stage t3 of each of the rows of light-emitting elements follows the data write and threshold compensation stage t2, that is, the initialization stage t1, the data write and threshold compensation stage t2 and the light emission stage t3 of each of the rows of light-emitting elements are each staggered backward by a specific duration (for example, a pulse width duration) compared with the initialization stage t1, the data write and threshold compensation stage t2 and the light emission stage t3 of a previous row of light-emitting elements, and the three stages are sequentially performed row by row. Scan timing of three adjacent rows (which are an (n−1)-th row, an n-th row and an (n+1)-th row, respectively) is shown in FIG. 4.

Figure 5:
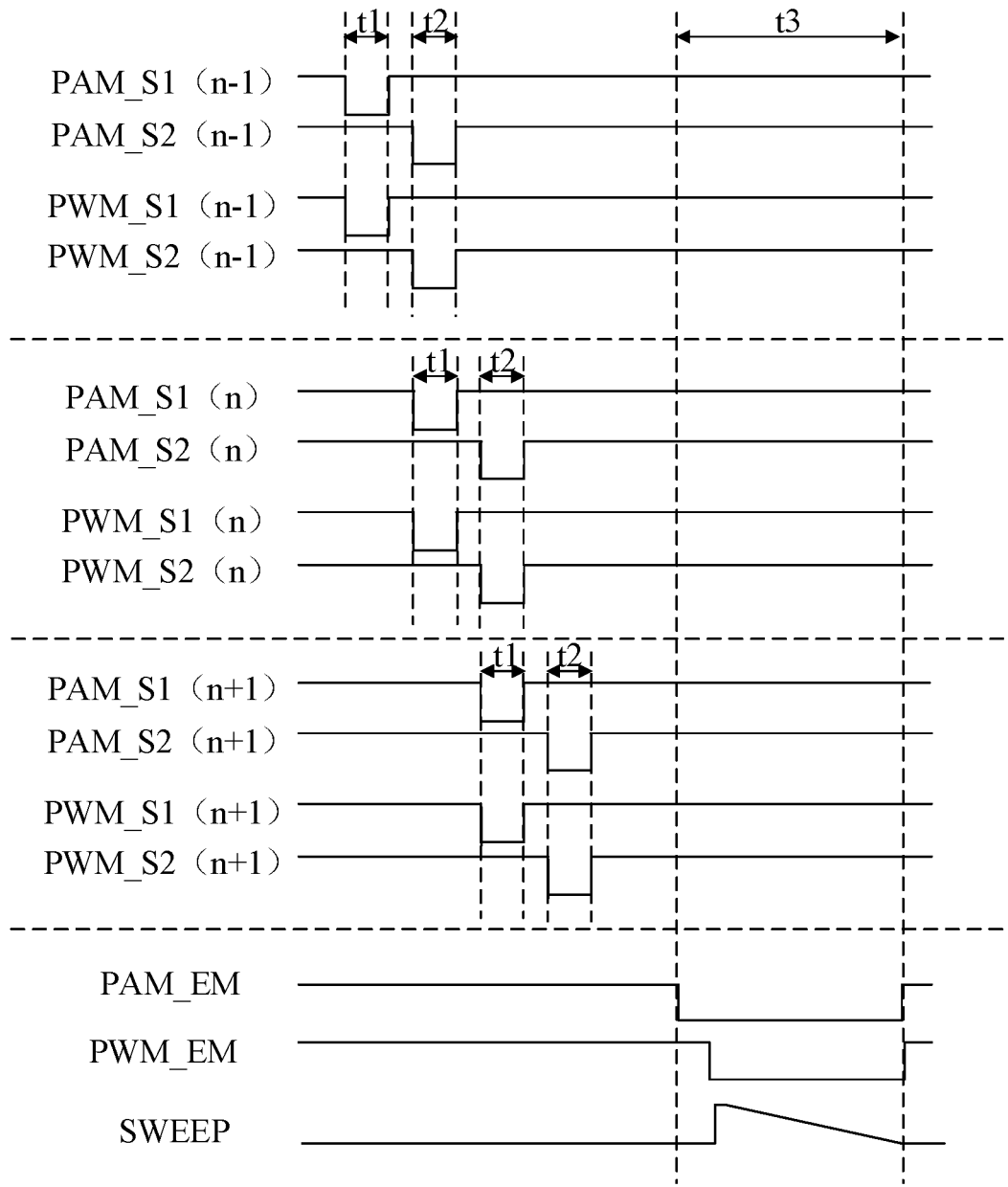

As shown in FIG. 5, in the embodiment of the present disclosure, for rows of light-emitting elements in the display panel, after some rows of the rows of light-emitting elements complete their initialization stages t1 and the data write and threshold compensation stages t2, the light emission stage t3 is performed in a unified manner. For example, after rows of light-emitting elements in an upper half of the display panel complete the initialization stages t1 and the data write and threshold compensation stages t2, the light emission stage t3 is performed in a unified manner. Then, rows of light-emitting elements in a lower half of the display panel complete the initialization stages t1 and the data write and threshold compensation stages t2 and perform the light emission stage t3 in a unified manner. Scan timing of the three adjacent rows (which are the (n−1)-th row, the n-th row and the (n+1)-th row, respectively) is shown in FIG. 5.

In another implementation, the rows of light-emitting elements may firstly perform the initialization stage t1 and the data write and threshold compensation stage t2 of the PAM circuit 110 row by row. After the rows of light-emitting elements perform the initialization stage t1 and the data write and threshold compensation stage t2 of the PAM circuit 110, the rows of light-emitting elements perform the initialization stage t1 and the data write and threshold compensation stage t2 of the PWM circuit 120 row by row. After the rows of light-emitting elements perform the initialization stage t1 and the data write and threshold compensation stage t2 of the PWM circuit 110, the rows of light-emitting elements perform the light emission stage t3 in a unified manner.

Based on the above working principle, in the embodiment of the present disclosure, a corresponding control signal (for example, the sweep signal V_SWEEP) of the PWM circuit 120 is used for providing different PWM duty cycles for the light-emitting elements having different luminescence efficiency, that is, it is set that at least at the maximum grayscale, drive currents of two light-emitting elements having different luminescence efficiency have different average current values. The first light-emitting element 11 has lower luminescence efficiency than the second light-emitting element 12 and the average current value of the first drive current driving the first light-emitting element 11 is configured to be greater than the average current value of the second drive current driving the second light-emitting element 12.

In an embodiment, the first driver circuit and the second driver circuit are configured to satisfy that $\Delta V\_SWEEP(1)/\Delta t\_SWEEP(1) < \Delta V\_SWEEP(2)/\Delta t\_SWEEP(2)$, where $\Delta V\_SWEEP(1)/\Delta t\_SWEEP(1)$ and $\Delta V\_SWEEP(2)/\Delta t\_SWEEP(2)$ are a changing rate of the sweep signal V_SWEEP configured for the pulse-width modulation circuit in the first driver circuit with time and a changing rate of the sweep signal V_SWEEP configured for the pulse-width modulation circuit in the second driver circuit with time, respectively.

$\Delta V\_SWEEP/\Delta t\_SWEEP$ denotes the changing rate of the sweep signal V_SWEEP with time. The smaller the value of $\Delta V\_SWEEP/\Delta t\_SWEEP$, the slower the sweep signal V_SWEEP changes; and the greater the value of $\Delta V\_SWEEP/\Delta t\_SWEEP$, the faster the sweep signal V_SWEEP changes. That $\Delta V\_SWEEP(1)/\Delta t\_SWEEP(1) < \Delta V\_SWEEP(2)/\Delta t\_SWEEP(2)$ indicates that the sweep signal V_SWEEP corresponding to the first light-emitting element 11 changes slower from high to low, which is conducive for the first driver circuit 21 to expand a duration range of the pulse width t_pwm of the drive current within a specific voltage range of the pulse-width modulation data voltage Vdata_PWM, to improve the average current value of the first drive current driving the first light-emitting element 11. The above relationship formula indicates that the sweep signal V_SWEEP corresponding to the second light-emitting element 12 changes faster from high to low, which is conducive for the second driver circuit 22 to expand the voltage range of the pulse-width modulation data voltage Vdata_PWM within the limited duration range of the pulse width t_pwm of the drive current and improve a voltage difference between pulse-width modulation data voltages Vdata_PWM corresponding to adjacent grayscales when the number of grayscales is the same, to output various voltage values. On the one hand, it is conducive to improving the output accuracy of the pulse-width modulation data voltage Vdata_PWM, to improve the output accuracy of the pulse width t_pwm of the drive current and improve the output accuracy of the drive current; on the other hand, an available voltage range of an integrated circuit (IC) that outputs the pulse-width modulation data voltage can be used more effectively. The sweep signals V_SWEEP configured for the pulse-width modulation circuits in the first driver circuit and the second driver circuit vary with time at different rates, which can improve the output accuracy and stability of the drive current of the light-emitting element which requires a relatively small average drive current on the basis that the driving conditions of the light-emitting element which requires a relatively large average drive current are satisfied.

Figure 6:
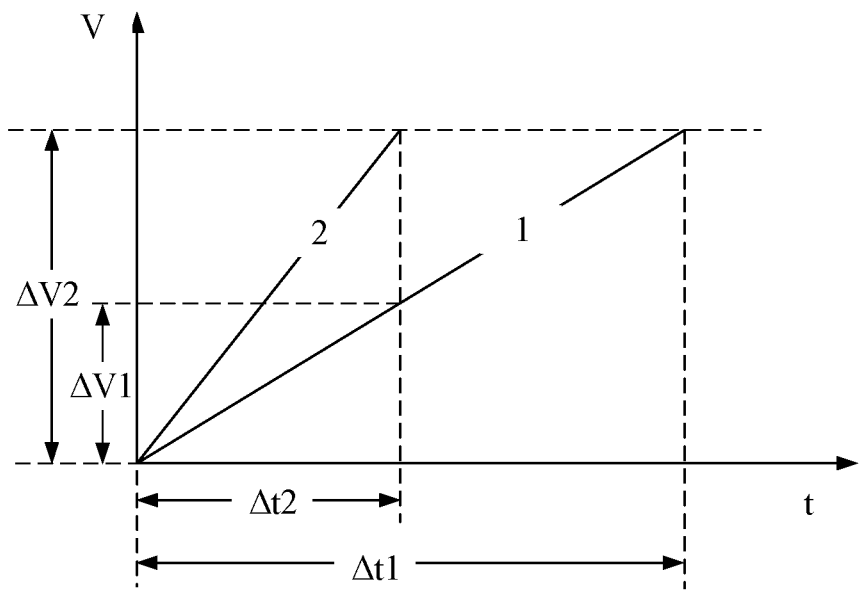
FIG. 6 is a schematic diagram of a correspondence relationship between a pulse-width modulation data voltage of a pulse-width modulation (PWM) circuit and an on duration of a drive transistor in the PWM circuit according to an embodiment of the present disclosure.

FIG. 6 is a schematic diagram of a correspondence relationship between a pulse-width modulation data voltage of a PWM circuit and an on duration of a drive transistor in the PWM circuit according to an embodiment of the present disclosure. Referring to FIG. 6, the principle for adjusting the output accuracy and stability of the drive current of the light-emitting element using the changing rate of the sweep signal V_SWEEP of the PWM circuit with time in the embodiment of the present disclosure is described below. As can be seen from the above analysis of the working principle of the driver circuit, in the PWM circuit 120, the voltage difference between the gate and the source of the drive transistor Dr_PWM determines whether the drive transistor Dr_PWM is turned on and further determines whether the PWM circuit 120 provides the control signal to the PAM circuit 110, to control the PAM circuit 110 to stop inputting the drive current to the light-emitting element 10. The data voltage Vdata_PWM inputted to the PWM circuit 120 and the varying sweep signal V_SWEEP determine the potential of the gate of the drive transistor Dr_PWM, and the second power voltage VDD_PWM inputted to the PWM circuit 120 determines the voltage of the source of the drive transistor Dr_PWM. Based on this, it can be seen that the grayscales of the light-emitting element 10 depend at least in part on the inputted data voltage Vdata_PWM and the sweep signal V_SWEEP. Based on the voltage variations of the data voltage Vdata_PWM and the sweep signal V_SWEEP and the light emission duration, the output of the grayscale of the light-emitting element is analyzed below.

In the embodiment of the present disclosure, the driver circuits corresponding to the first light-emitting element and the second light-emitting element are configured to satisfy that $\Delta V\_SWEEP\ (1)/\Delta t\_SWEEP\ (1) < \Delta V\_SWEEP\ (2)/\Delta t\_SWEEP\ (2)$, which may restrict the sweep signal V_SWEEP inputted to the driver circuit corresponding to the first light-emitting element to vary with time at a relatively small rate and the sweep signal V_SWEEP inputted to the driver circuit corresponding to the second light-emitting element to vary with time at a relatively large rate. Referring to FIG. 6, an abscissa denotes the pulse width t_pwm of the drive current, an intersection of an abscissa-axis and an ordinate-axis is a data point at time zero, an ordinate denotes the pulse-width modulation data voltage Vdata_PWM, and the intersection of the abscissa-axis and the ordinate-axis is a minimum voltage value of the pulse-width modulation data voltage Vdata_PWM. A slope of a first relationship curve 1 is relatively small, which illustrates a corresponding relationship between the pulse-width modulation data voltage Vdata_PWM of the driver circuit corresponding to the first light-emitting element and the pulse width t_pwm of the drive current, and the slope (absolute value) of the first relationship curve 1 is the same as the changing rate (absolute value) of the sweep signal V_SWEEP received by the first driver circuit with time. A slope of a second relationship curve 2 is relatively large, which illustrates a corresponding relationship between the pulse-width modulation data voltage Vdata_PWM of the driver circuit corresponding to the second light-emitting element and the pulse width t_pwm of the drive current, and the slope (absolute value) of the second relationship curve 2 is the same as the changing rate (absolute value) of the sweep signal V_SWEEP received by the second driver circuit with time. Assuming that the first light-emitting element 11 and the second light-emitting element 12 use the same relationship curve, for example, use the first relationship curve 1, a duration range of the pulse width t_pwm of the drive current generated for the first light-emitting element 11 through a voltage range $\Delta V2$ (a difference value between a maximum data voltage value and a minimum data voltage value) of the pulse-width modulation data voltage Vdata_PWM is $\Delta t1$, where $\Delta t1$ is the same as the preset number of grayscales of the first light-emitting element, for example, the preset number of grayscales is 256, and then $\Delta t1$ is divided into 255 periods containing 256 times. Correspondingly, the voltage range $\Delta V2$ of the pulse-width modulation data voltage Vdata_PWM corresponding to the first light-emitting element 11 is also divided into 225 voltage differences including 256 voltage values. Similarly, for the second light-emitting element 12, a duration range of the pulse width t_pwm of the drive current generated through a voltage range $\Delta V1$ (a difference between a maximum data voltage value and a minimum data voltage value) of the pulse-width modulation data voltage Vdata_PWM is $\Delta t2$. In order to make $\Delta t2$ correspond to the preset number of grayscales, $\Delta V1$ is divided the same as the preset number of grayscales. Since $\Delta V1$ is less than $\Delta V2$, the data voltage difference corresponding to adjacent grayscales of the second light-emitting element is relatively small, which increases the output difficulty of the driver chip (IC) that outputs the data voltage. In addition, the available voltage segment (for example, a segment of $\Delta V2$ higher than $\Delta V1$) of the driver chip is not fully utilized. In the present application, the first light-emitting element 11 uses the first relationship curve 1, and the second light-emitting element 12 uses the second relationship curve 2. The second light-emitting element 12 has a voltage variation range $\Delta V2$ within $\Delta t2$, and then $\Delta V2$ may be divided into 256 grayscales. In comparison, in the case where the second light-emitting element is driven by a voltage having a relatively large voltage variation rate, the relatively large voltage range may be divided according to the preset number of grayscales and two adjacent grayscales correspond to a relatively large voltage difference and the voltage value provided for each of the grayscales by the driver chip and the like is less affected by an error, achieving more stable brightness at any grayscale and more easily implementing the grayscales of the light-emitting element. Conversely, in the case where the second light-emitting element uses a relatively small voltage range which is divided according to the preset number of grayscales, two adjacent grayscales correspond to a relatively small voltage difference and the voltage value provided for each of the grayscales by the driver chip and the like is more affected by an error. Therefore, the brightness at any grayscale is unstable, and the grayscales are not easy to achieve. From this perspective, in the case where the second light-emitting element is driven by the sweep signal V_SWEEP having a relatively large voltage variation rate, the output accuracy of the grayscale or the brightness of the light-emitting element is higher. Further, in the embodiment of the present disclosure, the SWEEP signal of the first light-emitting element has a relatively small variation rate, and the SWEEP signal of the second light-emitting element has a relatively large variation rate and not only the drive current of the first light-emitting element having relatively low luminescence efficiency has a greater average current value which satisfies the requirement of light emission of the first light-emitting element, but also the current output accuracy of the second light-emitting element is improved, the brightness output corresponding to the grayscale is more stable, and the grayscale is controlled with higher accuracy.

Referring to FIG. 3, in an embodiment, the first driver circuit and the second driver circuit satisfy that $\Delta t\_SWEEP (1) > \Delta t\_SWEEP (2)$, where $\Delta t\_SWEEP (1)$ and $\Delta t\_SWEEP (2)$ are a duration within which the sweep signal V_SWEEP configured for the pulse-width modulation circuit in the first driver circuit changes and a duration within which the sweep signal V_SWEEP configured for the pulse-width modulation circuit in the second driver circuit changes, respectively.

It is to be understood that the variation rate of the sweep signal V_SWEEP is mainly determined by two parameters $\Delta V\_SWEEP$ and $\Delta t\_SWEEP$. In one embodiment, the durations within which the sweep signals V_SWEEP corresponding to different light-emitting elements vary are mainly distinguished. The variation rate is reduced by improving the duration of the variation and the light-emitting element (the first light-emitting element) having relatively low luminescence efficiency has a longer light emission duration and a larger average drive current. In one embodiment, for the second light-emitting element which has relatively high luminescence efficiency and requires a relatively small average current value, the duration within which the sweep signal V_SWEEP changes is shortened and the changing rate of the sweep signal V_SWEEP is increased. In this manner, the output accuracy of the average current of the second light-emitting element is improved, the output brightness corresponding to the grayscale is more stable, and the output accuracy of the grayscale is higher. In the present embodiment, the sweep signals V_SWEEP corresponding to different light-emitting elements have the same maximum voltage difference ($\Delta V\_SWEEP$) or different $\Delta V\_SWEEP$. On the basis of this, the duration within which the sweep signal V_SWEEP changes is adjusted. From the perspective of a drive terminal, the variation rate of the sweep signal is easier to control by simply controlling the timing, and the difference in magnitude between the average current values is further achieved. Compared with the design of a hardware structure, the timing is implemented and designed with lower difficulty and controlled more flexibly.

Figure 7:
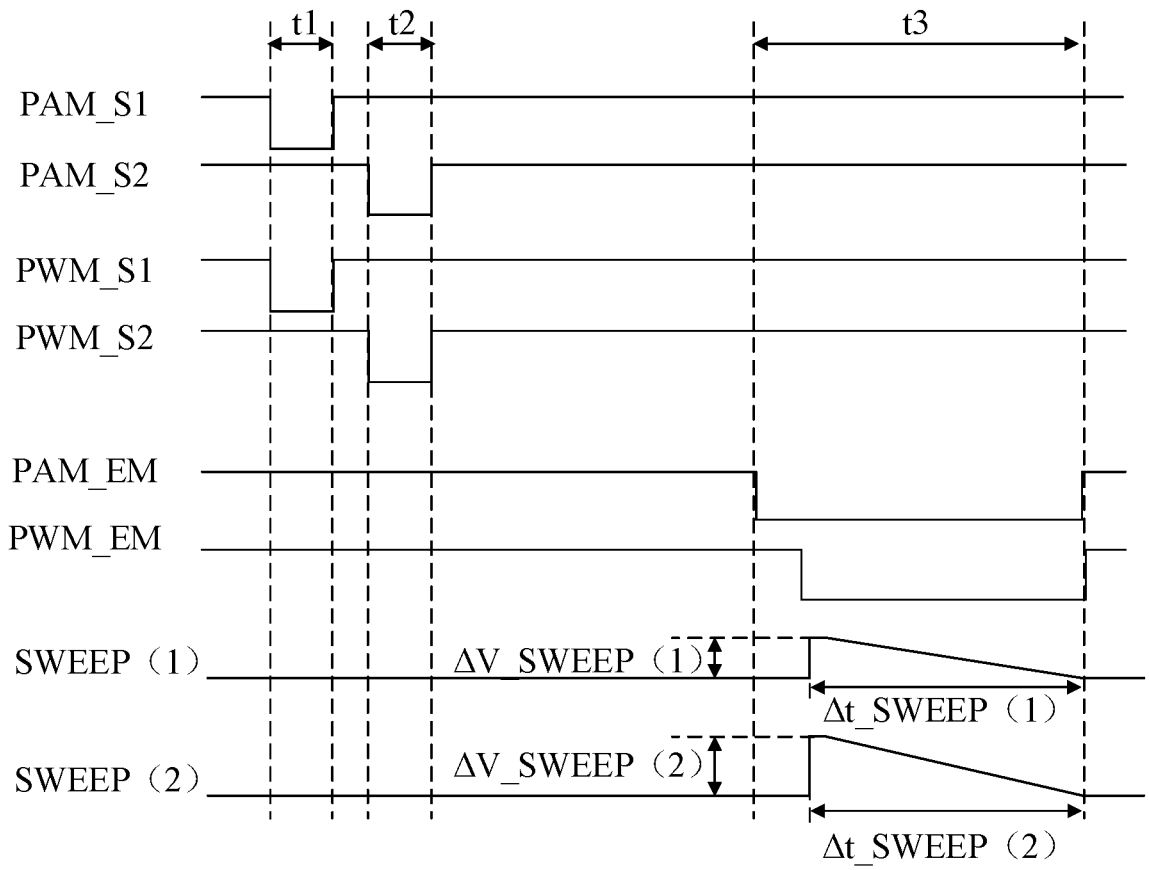
FIG. 7 is another driver circuit timing diagram of a first driver circuit and a second driver circuit according to an embodiment of the present disclosure.

FIG. 7 is another driver circuit timing diagram of a first driver circuit and a second driver circuit according to an embodiment of the present disclosure. Referring to FIG. 7, in another embodiment of the present disclosure, the first driver circuit and the second driver circuit satisfy that $\Delta V\_SWEEP (1) < \Delta V\_SWEEP (2)$, where $\Delta V\_SWEEP (1)$ and $\Delta V\_SWEEP (2)$ are a maximum voltage difference of the sweep signal V_SWEEP configured for the pulse-width modulation circuit in the first driver circuit and a maximum voltage difference of the sweep signal V_SWEEP configured for the pulse-width modulation circuit in the second driver circuit, respectively.

As described above, the variation rate of the sweep signal V_SWEEP is mainly determined by the two parameters $\Delta V\_SWEEP$ and $\Delta t\_SWEEP$. In one embodiment, the maximum voltage differences of the sweep signals V_SWEEP corresponding to different light-emitting elements are distinguished. The variation rate is reduced by reducing the amplitude and the light-emitting element (the first light-emitting element) having relatively low luminescence efficiency has the longer light emission duration and the larger average drive current. In one embodiment, for the second light-emitting element which has relatively high luminescence efficiency and requires a relatively small average current value, the voltage difference within which the sweep signal V_SWEEP changes is increased and the changing rate of the sweep signal V_SWEEP is increased. In this manner, the output accuracy of the average current of the second light-emitting element is improved, the output brightness corresponding to the grayscale is more stable, and the output accuracy of the grayscale is higher. Similarly, in the present embodiment, the sweep signals V_SWEEP corresponding to different light-emitting elements may vary within the same duration or different durations.

It is to be noted that the above sweep signal V_SWEEP is the ramp signal, indicating that the sweep signal V_SWEEP may be a linearly varying signal, where the variation rate of the sweep signal V_SWEEP is affected by relatively few parameters and the modulation manner of the sweep signal V_SWEEP is relatively simple. Of course, in other embodiments of the present disclosure, other types of sweep signal V_SWEEP, such as a sweep signal varying in the form of a curve, may be provided, which is not limited here.

Figure 8:
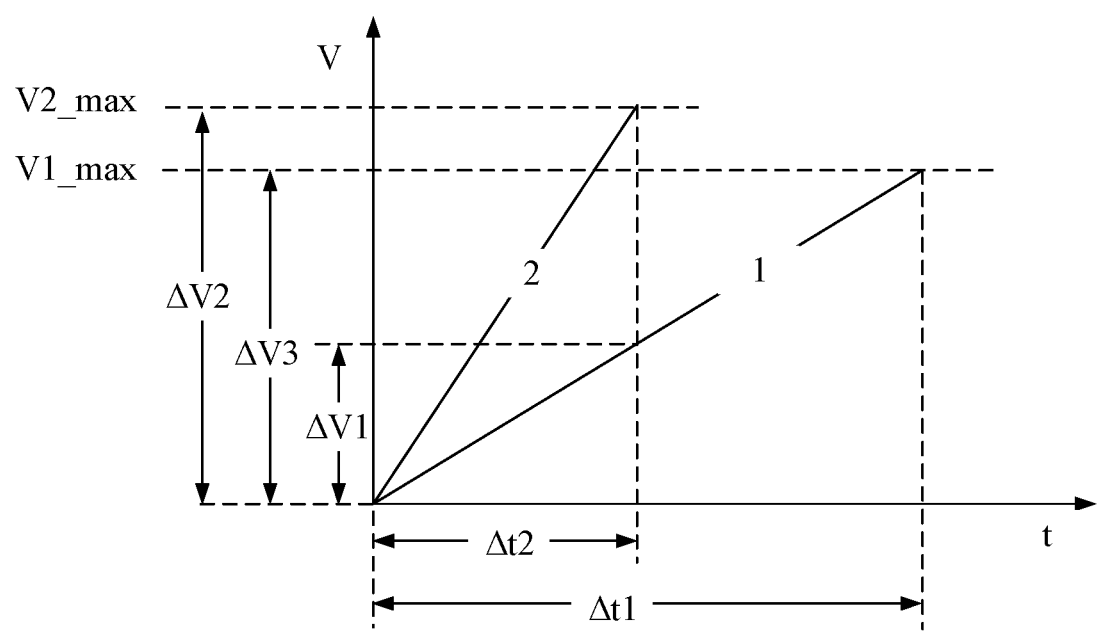
FIG. 8 is a schematic diagram of another correspondence relationship between a pulse-width modulation data voltage of a PWM circuit and an on duration of a drive transistor in the PWM circuit according to an embodiment of the present disclosure.

FIG. 8 is a schematic diagram of another correspondence relationship between a pulse-width modulation data voltage of a PWM circuit and an on duration of a drive transistor in the PWM circuit according to an embodiment of the present disclosure. An abscissa denotes the pulse width t_pwm of the drive current, an intersection of an abscissa-axis and an ordinate-axis is a data point at time zero, an ordinate denotes the pulse-width modulation data voltage Vdata_PWM, and the intersection of the abscissa-axis and the ordinate-axis is a minimum voltage value of the pulse width modulation data voltage Vdata_PWM. A slope of a first relationship curve 1 is relatively small, which illustrates a corresponding relationship between the pulse-width modulation data voltage Vdata_PWM of the driver circuit corresponding to the first light-emitting element and the pulse width t_pwm of the drive current, and the slope (absolute value) of the first relationship curve 1 is the same as the changing rate (absolute value) of the sweep signal V_SWEEP received by the first driver circuit with time. A slope of a second relationship curve 2 is relatively large, which illustrates a corresponding relationship between the pulse-width modulation data voltage Vdata_PWM of the driver circuit corresponding to the second light-emitting element and the pulse width t_pwm of the drive current, and the slope (absolute value) of the second relationship curve 2 is the same as the changing rate (absolute value) of the sweep signal V_SWEEP received by the second driver circuit with time. As shown in FIG. 8, on the basis that the slope of the first relationship curve 1 is smaller than the slope of the second relationship curve 2, the first relationship curve 1 and the second relationship curve 2 may vary within different durations and different voltage ranges. The first relationship curve changes within a duration Δt1, and the second relationship curve changes within a duration Δt2. Within the duration Δt2, the voltage variation range of the first relationship curve is ΔV1, and the voltage variation range of the second relationship curve is ΔV2. For convenience of understanding, for example, a maximum voltage value V1_max of the first relationship curve is smaller than a maximum voltage value V2_max of the second relationship curve. Similarly, for the second light-emitting element, in the case where the second light-emitting element is driven by a voltage having a larger variation rate of the second relationship curve, the relatively large voltage range may be divided according to the preset number of grayscales and two adjacent grayscales correspond to a relatively large voltage difference and the voltage value provided for each of the grayscales by the driver chip and the like is less affected by an error, achieving more stable brightness at any grayscale and more easily implementing the grayscales of the light-emitting element. Therefore, the current output accuracy of the second light-emitting element is improved, the brightness output corresponding to the grayscale is more stable, and the grayscale is controlled with higher accuracy.

For the pulse-width modulation data voltage in the driver circuit, the first driver circuit 21 and the second driver circuit 22 satisfy that ΔVdata_PWM (1)<ΔVdata_PWM (2).

ΔVdata_PWM (1) and ΔVdata_PWM (2) are a voltage range of the pulse-width modulation data voltage Vdata_PWM configured for the pulse-width modulation circuit in the first driver circuit 21 and a voltage range of the pulse-width modulation data voltage Vdata_PWM configured for the pulse-width modulation circuit in the second driver circuit 22, respectively.

As shown in FIG. 6, the pulse-width modulation data voltages Vdata_PWM of the first driver circuit 21 and the second driver circuit 22 may have the same voltage range:

ΔVdata_PWM(1)=ΔVdata_PWM(2)=ΔV2.

As shown in FIG. 8, the voltage range ΔVdata_PWM (1) (ΔV3 shown in FIG. 8) of the pulse-width modulation data voltage Vdata_PWM configured for the pulse-width modulation circuit in the first driver circuit 21 is less than the voltage range ΔVdata_PWM (2) (ΔV2 shown in FIG. 8) of the pulse-width modulation data voltage Vdata_PWM configured for the pulse-width modulation circuit in the second driver circuit 22. In this manner, the current output accuracy of the second light-emitting element can be further improved, the brightness output corresponding to the grayscale is more stable, and the grayscale is controlled with higher accuracy.

In another implementation, for the pulse-width modulation data voltage in the driver circuit, the first driver circuit 21 and the second driver circuit 22 satisfy that ΔVdata_PWM (1)>ΔVdata_PWM (2).

ΔVdata_PWM (1) and ΔVdata_PWM (2) are the voltage range of the pulse-width modulation data voltage Vdata_PWM configured for the pulse-width modulation circuit in the first driver circuit 21 and the voltage range of the pulse-width modulation data voltage Vdata_PWM configured for the pulse-width modulation circuit in the second driver circuit 22, respectively.

In an implementation, at the same grayscale, the first driver circuit 21 and the second driver circuit 22 may have the same pulse-width modulation data voltage Vdata_PWM.

In another implementation, at the same grayscale, the first driver circuit 21 and the second driver circuit 22 may have different pulse-width modulation data voltages Vdata_PWM.

In a specific application scenario, the display panel generally includes red, green and blue light-emitting elements. For an actual application scenario, with continued reference to the structure of the display panel shown in FIG. 1, the display panel further includes a third light-emitting element 13 and a third driver circuit 23. The third driver circuit 23 is electrically connected to the third light-emitting element 13. Referring to the driver circuit shown in FIG. 2, the third driver circuit 23 also includes the pulse-amplitude modulation circuit 110 and the pulse-width modulation circuit 120, where the pulse-amplitude modulation circuit 110 is configured to control the amplitude of the drive current based on the applied pulse-amplitude modulation data voltage Vdata_PAM, and the pulse-width modulation circuit 120 is configured to control the pulse width of the drive current based on the applied pulse-width modulation data voltage Vdata_PWM and the sweep signal V_SWEEP.

Figure 9:
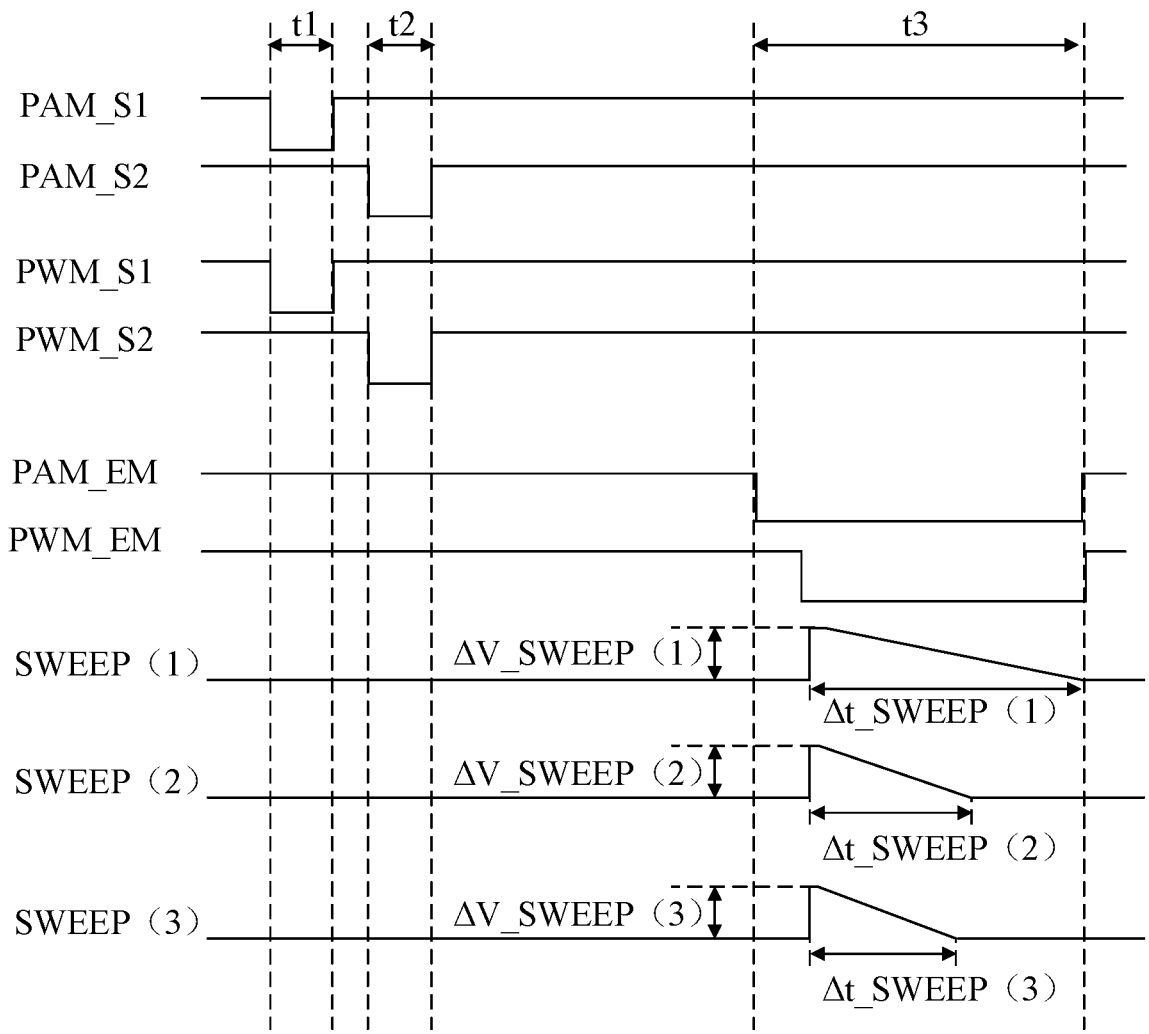
FIG. 9 is a driver circuit timing diagram of three driver circuits according to an embodiment of the present disclosure.

FIG. 9 is a driver circuit timing diagram of three driver circuits according to an embodiment of the present disclosure. Referring to FIG. 9, the first driver circuit, the second driver circuit and the third driver circuit satisfy that ΔV_SWEEP (1)/Δt_SWEEP (1)<ΔV_SWEEP (2)/Δt_SWEEP (2)<ΔV_SWEEP (3)/Δt_SWEEP (3), where ΔV_SWEEP (1)/Δt_SWEEP (1), ΔV_SWEEP (2)/Δt_SWEEP (2) and ΔV_SWEEP (3)/Δt_SWEEP (3) are a changing rate of the sweep signal V_SWEEP configured for the pulse-width modulation circuit in the first driver circuit with time, a changing rate of the sweep signal V_SWEEP configured for pulse-width modulation circuit in the second driver circuit with time a changing rate of the sweep signal V_SWEEP configured for the pulse-width modulation circuit in the third driver circuit with time, respectively.

Similarly, in the case where the display panel includes three light-emitting elements and any two of the three light-emitting elements have a difference in luminescence efficiency, at the same grayscale, especially at the maximum grayscale, the three light-emitting elements require different drive currents and the brightness of the three light-emitting elements is controlled differently. Based on this, in the present embodiment, sweep signals having suitable variation rates are provided according to the luminescence efficiency of the three light-emitting elements and each of the three light-emitting elements can obtain a suitable light emission duration and a suitable average drive current. Therefore, from the perspective of the requirements of the light-emitting elements for the currents, the brightness of each light-emitting element is controlled more targeted and the brightness of each light-emitting element and the grayscale of the pixel can be controlled more accurately.

In the present embodiment, for example, the first light-emitting element 11 is a red light-emitting element, the second light-emitting element 12 is a green light-emitting element, and the third light-emitting element 13 is a blue light-emitting element. The red, green and blue light-emitting elements have low, medium and high luminescence efficiency, respectively. Therefore, the variation rates of the sweep signal V_SWEEP corresponding to the three light-emitting elements increase gradually, that is, the red light-emitting element having relatively low luminescence efficiency is configured with a sweep signal V_SWEEP varying slower, to increase the effective light emission duration and the average drive current value of the red light-emitting element and satisfy the requirement of the red light-emitting element for a larger drive current at the same grayscale or at least at the maximum grayscale.

With continued reference to FIG. 9, based on the above red, green and blue light-emitting elements, in the embodiments of the present disclosure, the first driver circuit, the second driver circuit and the third driver circuit may be further configured to satisfy that $\Delta t\_SWEEP (1) > \Delta t\_SWEEP (2) > \Delta t\_SWEEP (3)$ and $\Delta t\_SWEEP (1) - \Delta t\_SWEEP (2) > \Delta t\_SWEEP (2) - \Delta t\_SWEEP (3)$, where $\Delta t\_SWEEP (1)$, $\Delta t\_SWEEP (2)$ and $\Delta t\_SWEEP (3)$ are a duration within which the sweep signal V_SWEEP configured for the pulse-width modulation circuit in the first driver circuit changes, a duration within which the sweep signal V_SWEEP configured for the pulse-width modulation circuit in the second driver circuit changes and a duration within which the sweep signal V_SWEEP configured for the pulse-width modulation circuit in the third driver circuit changes, respectively.

In an actual application scenario, light-emitting elements of different colors are limited by the development and design of materials and structures. Generally, the luminescence efficiency of the red light-emitting element, the green light-emitting element and the blue light-emitting element increase sequentially, and the luminescence efficiency of the red light-emitting element is much lower than that of the green light-emitting element and that of the blue light-emitting element. Based on the differences in luminescence efficiency of the existing light-emitting elements, more targeted control may be provided for the average current, that is, the light emission duration of the red light-emitting element is configured to be much longer than that of the green light-emitting element and that of the blue light-emitting element, and the average current value of the drive current of the red light-emitting element is configured to be much greater than that of the green light-emitting element and that of the blue light-emitting element. Further, the variation rate of the sweep signal V_SWEEP of the red light-emitting element may be configured to be much smaller than that of the green light-emitting element and that of the blue light-emitting element, for example, $\Delta t\_SWEEP (1) - \Delta t\_SWEEP (2) > \Delta t\_SWEEP (2) - \Delta t\_SWEEP (3)$, where $\Delta t\_SWEEP (1) - \Delta t\_SWEEP (2)$ may be configured to be much greater than $\Delta t\_SWEEP (2) - \Delta t\_SWEEP (3)$.

Considering that the factors affecting the drive current further include the amplitude of the drive current in the first driver circuit, in the embodiment of the present disclosure, the pulse-amplitude modulation circuits are used to differently configure the average current values of the drive currents of the light-emitting elements. In an embodiment, with continued reference to FIGS. 1 and 2, the pulse-amplitude modulation circuit 110 in the first driver circuit 21 is configured with a pulse-amplitude modulation data voltage Vdata_PAM (1), and the pulse-amplitude modulation circuit 110 in the second driver circuit 22 is configured with a pulse-amplitude modulation data voltage Vdata_PAM (2), where Vdata_PAM (1) and Vdata_PAM (2) may be different.

Here, that the first light-emitting element 11 and the second light-emitting element 12 correspond to different pulse-amplitude modulation data voltages refers to that under the same reference (at the same grayscale), the different pulse-amplitude modulation data voltages are provided. It is to be understood that the pulse-amplitude modulation data voltage Vdata_PAM determines the amplitude of the drive current outputted by the PAM circuit 110 and is proportional to the amplitude of the drive current outputted by the PAM circuit 110. On the premise that the effective light emission controlled by the drive current in the period of one frame is fixed, the average current value of the drive current can be increased by increasing the amplitude of the drive current and suitable average currents can be provided to the light-emitting elements having different luminescence efficiency to meet the requirements of the light-emitting elements for different currents.

In one embodiment, the pulse-amplitude modulation circuit 110 is configured to be driven by the first power voltage VDD_PAM, and the pulse-width modulation circuit 120 is configured to be driven by the second power voltage VDD_PWM. The first driver circuit 21 and the second driver circuit 22 satisfy that $(Vdata\_PAM (1) - VDD\_PAM (1))^2 > (Vdata\_PAM (2) - VDD\_PAM (2))^2$, where VDD_PAM (1) and VDD_PAM (2) are a first power voltage configured for the pulse-amplitude modulation circuit in the first driver circuit and a first power voltage configured for the pulse-amplitude modulation circuit in the second driver circuit, respectively.

In the PAM circuit 110, the drive current I_pam of the light-emitting element 10 satisfies the formula: $I\_pam = K \cdot (Vdata\_PAM - VDD\_PAM)^2$. For the first light-emitting element 11 and the second light-emitting element 12 having different luminescence efficiency, the corresponding circuits are configured as follows: $(Vdata\_PAM (1) - VDD\_PAM (1))^2 > (Vdata\_PAM (2) - VDD\_PAM (2))^2$, which is to more accurately restrict the amplitude of the drive current of the first light-emitting element to be greater than the amplitude of the drive current of the second light-emitting element. Therefore, it can be ensured that the average current value of the drive current of the first light-emitting element is greater than the average current value of the drive current of the second light-emitting element and the light-emitting elements having different luminescence efficiency have suitable average currents.

In order to solve the problem that the light-emitting elements have different luminescence efficiency, as described in the preceding embodiment, two control signals, that is, the sweep signal V_SWEEP in the PWM circuit 120 and the pulse-amplitude modulation data voltage Vdata_PAM in the PAM circuit 110, may be separately designed or may be used simultaneously in the same scheme. In an embodiment, in another embodiment of the present disclosure, the pulse-amplitude modulation circuit is configured to be driven by the first power voltage VDD_PAM, and the pulse-width modulation circuit is configured to be driven by the second power voltage VDD_PWM; and the first driver circuit and the second driver circuit satisfy that $\Delta V\_SWEEP / \Delta t\_SWEEP (1) > \Delta V\_SWEEP / \Delta t\_SWEEP (2)$ and $(Vdata\_PAM (1) - VDD\_PAM (1))^2 > (Vdata\_PAM (2) - VDD\_PAM (2))^2$, where $\Delta V\_SWEEP (1) / \Delta t\_SWEEP (1)$ and $\Delta V\_SWEEP (2) / \Delta t\_SWEEP (2)$ are the changing rate of the sweep signal V_SWEEP configured for the pulse-width modulation circuit in the first driver circuit with time and the changing rate of the sweep signal V_SWEEP configured for the pulse-width modulation circuit in the second driver circuit with time, respectively, Vdata_PAM (1) and Vdata_PAM (2) are the pulse-amplitude modulation data voltage configured for the pulse-amplitude modulation circuit in the first driver circuit and the pulse-amplitude modulation data voltage configured for the pulse-amplitude modulation circuit in the second driver circuit, respectively, and VDD_PAM (1) and VDD_PAM (2) are the first power voltage configured for the pulse-amplitude modulation circuit in the first driver circuit and the first power voltage configured for the pulse-amplitude modulation circuit in the second driver circuit, respectively.

In the present embodiment, for the first light-emitting element having relatively low luminescence efficiency, the sweep signal V_SWEEP of the PWM circuit 120 of the first light-emitting element has a relatively smaller variation rate, that is, the sweep signal V_SWEEP changes relatively slow, to increase the light emission duration of the light-emitting element. In one embodiment, a relatively large drive current I_pam is generated using the pulse-amplitude modulation data voltage Vdata_PAM in the PAM circuit 110 of the first light-emitting element, to increase the current value of the light-emitting element in a light-emitting process. Therefore, through the design of the two control signals, it can be ensured that the drive current of the light-emitting element having relatively low luminescence efficiency has a larger average value, to solve the problem of low luminescence efficiency and more accurately control the brightness of the light-emitting element. In one embodiment, the brightness of different light-emitting elements at the same grayscale can be more balanced, to avoid the problems such as display non-uniformity and a color cast. In addition, for the second light-emitting element which has relatively high luminescence efficiency and requires a relatively small current, the drive current I_pam of the second light-emitting element is appropriately reduced, which can reduce the design requirement for the variation rate of the sweep signal V_SWEEP in the PWM circuit 120. Therefore, it is conducive to designing a sweep signal V_SWEEP having a higher variation rate, to improve the stability of the brightness at each grayscale and the output accuracy of the grayscale.

Further, considering that the grayscale of the pixel unit may be achieved through a ratio of light-emitting elements of different colors. The grayscale of the pixel depends on not only the brightness of each light-emitting element but also a light-emitting area of each light-emitting element. Based on this, in the embodiment of the present disclosure, a light-emitting area of the first light-emitting element may be configured to be greater than a light-emitting area of the second light-emitting element.

For the first light-emitting element having relatively low luminescence efficiency, the light-emitting area of the first light-emitting element is configured to be greater than those of other light-emitting elements, which can compensate for relatively low brightness caused by the relatively low luminescence efficiency. Through the design of different light-emitting areas, the differences in luminescence efficiency of the light-emitting elements in the pixel unit are compensated for, which can ensure a balanced ratio of the light-emitting elements in the same pixel unit and different light-emitting elements in the same pixel unit have more balanced brightness at the same grayscale, avoiding the problems such as the display non-uniformity and the color cast.

Further, in the embodiment of the present disclosure, the average current value of the first drive current is inversely proportional to the light-emitting area of the first light-emitting element, and the average current value of the second drive current is inversely proportional to the light-emitting area of the second light-emitting element.

As described above, the design scheme of the average value of the drive current and the design scheme of the light-emitting area provided in the embodiments of the present disclosure can both compensate for the difference in luminescence efficiency of the display panel and the brightness of the light-emitting elements in the pixel unit is more balanced and controlled more accurately. In the case where the above schemes are used at the same time, the design scheme of the average value of the drive current may be further instructed according to the design scheme of the light-emitting area. In other words, on the basis that the light-emitting areas of the light-emitting elements are fixed, when the average current values of the drive currents are used to solve the problem of the difference in luminescence efficiency of the light-emitting elements, the difference between the light-emitting areas of the light-emitting elements needs to be considered synchronously when the average current values of the drive currents of the light-emitting elements are designed to ensure the control logic that the average current value of the drive current is inversely proportional to the light-emitting area of the light-emitting element.

Figure 10:
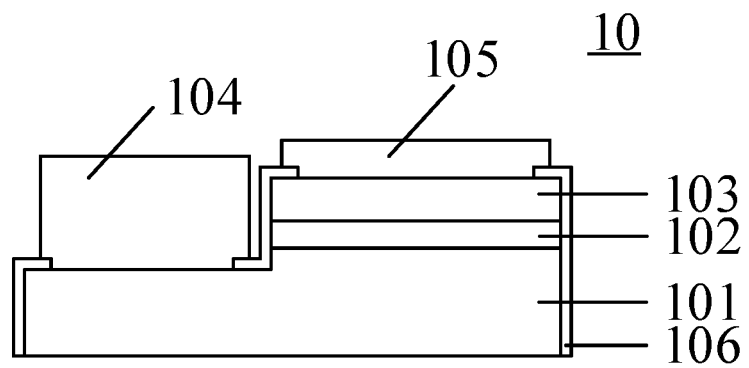
FIGS. 10 and 11 are structure diagrams of a light-emitting element according to an embodiment of the present disclosure.
Figure 11:
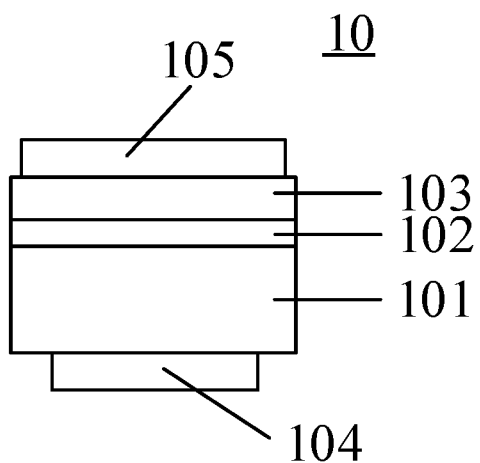

FIGS. 10 and 11 are structure diagrams of a light-emitting element according to an embodiment of the present disclosure. As shown in FIGS. 10 and 11, the light-emitting element 10 may be an inorganic light-emitting diode (LED). The LED includes an N-type semiconductor layer 101, an active layer 102 and a P-type semiconductor layer 103 which are stacked and further includes an N electrode 104 and a P electrode 105, where the N electrode 104 is electrically connected to the N-type semiconductor layer 101 and the P electrode 105 is electrically connected to the P-type semiconductor layer 103. The LED may further include an insulating layer 106 (as shown in FIG. 10) which is used for protection and insulation.

Figure 12:
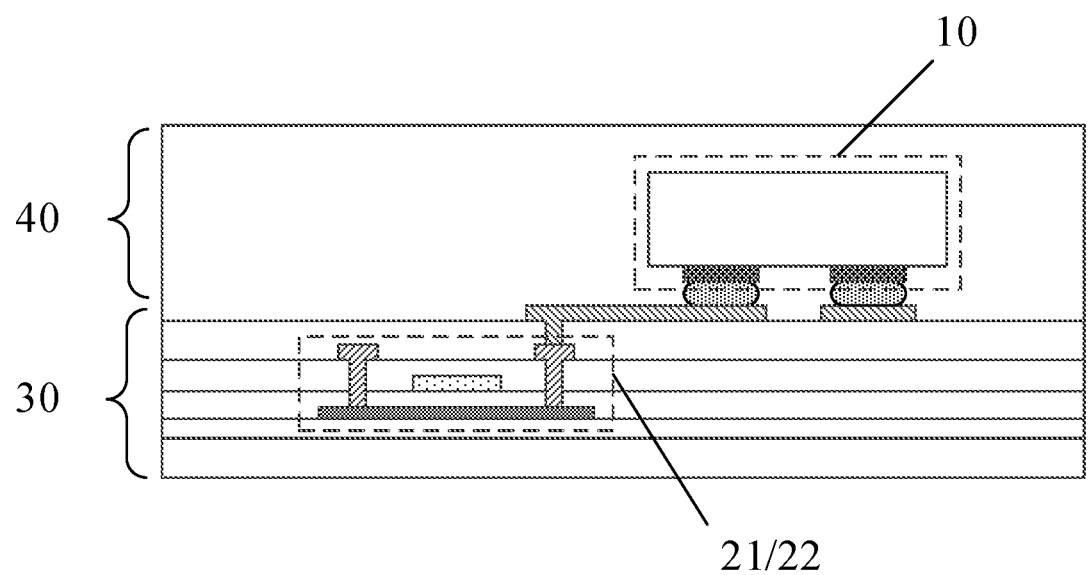
FIG. 12 is a partial sectional view of a display panel according to an embodiment of the present disclosure.

FIG. 12 is a partial sectional view of a display panel according to an embodiment of the present disclosure. As shown in FIG. 12, the display panel includes a driver circuit layer 30, an encapsulation layer 40 and the light-emitting element 10 disposed between the driver circuit layer 30 and the encapsulation layer 40. The driver circuit layer 30 includes the driver circuit 21/22, and the driver circuit 21/22 drives the light-emitting element 10 to emit light. FIG. 12 illustrates the films of the display panel, and the display panel provided in the present application may also have other film structures.

Figure 13:
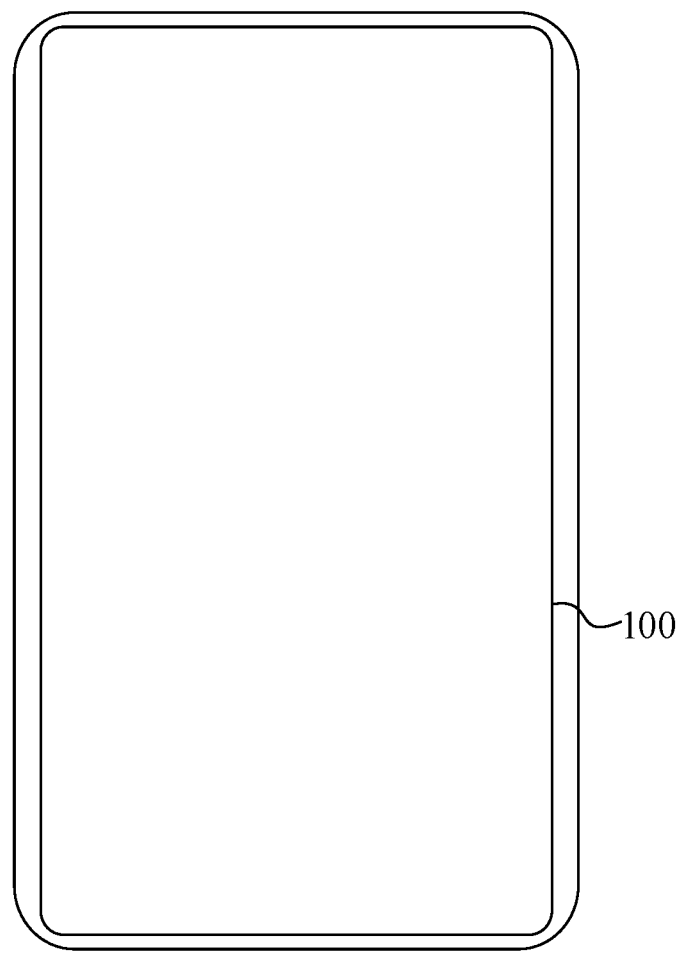
FIG. 13 is a structure diagram of a display device according to an embodiment of the present disclosure.

Based on the same inventive concept, the embodiments of the present disclosure provide a display device. FIG. 13 is a structure diagram of a display device according to an embodiment of the present disclosure. Referring to FIG. 13, the display device includes any one display panel 100 according to the embodiments of the present disclosure.

In one embodiment, the display device may be any product or component having a display function, such as a mobile phone (as shown in FIG. 13), a tablet computer, a television, a display, a notebook computer, a digital photo frame or a navigator. For an implementation of the display device, reference may be made to the preceding embodiments of the display panel, and repeated descriptions are not repeated.

In the display device provided in the embodiments of the present disclosure, based on different electrical characteristics of two light-emitting elements in the display panel, the two light-emitting elements have different luminescence efficiency, the driver circuit provides a relatively large average current value for the light-emitting element which has relatively low luminescence efficiency and requires a relatively large drive current, to meet the requirements of the light-emitting elements for drive currents and ensure that driver circuits adapt to the characteristics in luminescence efficiency of different light-emitting elements and provide more accurate drive currents. Therefore, the light-emitting elements can emit light more accurately (especially at a high grayscale), avoiding unstable brightness output, non-uniform display brightness, a relatively poor display effect and the like.

What is claimed is:

1. A display panel, comprising:
    a first light-emitting element and a second light-emitting element, wherein the first light-emitting element and the second light-emitting element emit light in different colors; and
    a first driver circuit and a second driver circuit; wherein the first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light;
    wherein each of the first driver circuit and the second driver circuit comprises a pulse-amplitude modulation circuit and a pulse-width modulation circuit;
    wherein the pulse-amplitude modulation circuit of the first driver circuit is configured to control an amplitude of the first drive current based on an applied pulse-amplitude modulation data voltage Vdata_PAM, and the pulse-width modulation circuit of the first driver circuit is configured to control a pulse width of the first drive current based on an applied pulse-width modulation data voltage Vdata_PWM and a sweep signal V_SWEEP; the pulse-amplitude modulation circuit of the second driver circuit is configured to control an amplitude of the second drive current based on an applied pulse-amplitude modulation data voltage Vdata_PAM, and the pulse-width modulation circuit of the second driver circuit is configured to control a pulse width of the second drive current based on an applied pulse-width modulation data voltage Vdata_PWM and a sweep signal V_SWEEP,
    wherein at least at a maximum grayscale, an average current value of the first drive current is greater than an average current value of the second drive current,
    wherein a calculation formula of the average current value is I_ave=I_pam*t_pwm/t_frame, wherein I_pam denotes an amplitude of the first drive current or the second drive current; t_pwm denotes a pulse width of the first drive current or the second drive current in each frame; and t_frame denotes time at which a pixel is driven in one frame.

2. The display panel according to claim 1, wherein at a same grayscale, an average current value of the first drive current is greater than an average current value of the second drive current.

3. The display panel according to claim 1, wherein the first light-emitting element is a red light-emitting element, and the second light-emitting element is a green light-emitting element.

4. The display panel according to claim 1, wherein luminescence efficiency of the first light-emitting element is lower than luminescence efficiency of the second light-emitting element.

5. The display panel according to claim 1, wherein the first driver circuit and the second driver circuit satisfy that $\Delta V\_SWEEP(1)/\Delta t\_SWEEP(1) < \Delta V\_SWEEP(2)/\Delta t\_SWEEP(2)$;
    wherein $\Delta V\_SWEEP(1)/\Delta t\_SWEEP(1)$ and $\Delta V\_SWEEP(2)/\Delta t\_SWEEP(2)$ are a changing rate of the sweep signal V_SWEEP configured for the pulse-width modulation circuit in the first driver circuit with time and a changing rate of the sweep signal V_SWEEP configured for the pulse-width modulation circuit in the second driver circuit with time, respectively.

6. The display panel according to claim 5, wherein the first driver circuit and the second driver circuit satisfy that $\Delta Vdata\_PWM(1) \leq \Delta Vdata\_PWM(2)$;
    wherein $\Delta Vdata\_PWM(1)$ and $\Delta Vdata\_PWM(2)$ are a voltage range of the applied pulse-width modulation data voltage Vdata_PWM configured for the pulse-width modulation circuit in the first driver circuit and a voltage range of the applied pulse-width modulation data voltage Vdata_PWM configured for the pulse-width modulation circuit in the second driver circuit, respectively.

7. The display panel according to claim 1, wherein the first driver circuit and the second driver circuit satisfy that $\Delta t\_SWEEP(1) > \Delta t\_SWEEP(2)$;
    wherein $\Delta t\_SWEEP(1)$ and $\Delta t\_SWEEP(2)$ are a duration within which the sweep signal V_SWEEP configured for the pulse-width modulation circuit in the first driver circuit changes and a duration within which the sweep signal V_SWEEP configured for the pulse-width modulation circuit in the second driver circuit changes, respectively.

8. The display panel according to claim 1, wherein the first driver circuit and the second driver circuit satisfy that $\Delta V\_SWEEP(1) < \Delta V\_SWEEP(2)$;
    wherein $\Delta V\_SWEEP(1)$ and $\Delta V\_SWEEP(2)$ are a maximum voltage difference of the sweep signal V_SWEEP configured for the pulse-width modulation circuit in the first driver circuit and a maximum voltage difference of the sweep signal V_SWEEP configured for the pulse-width modulation circuit in the second driver circuit, respectively.

9. The display panel according to claim 1, further comprising a third light-emitting element and a third driver circuit, wherein the third driver circuit is electrically connected to the third light-emitting element;
    wherein the third driver circuit comprises the pulse-amplitude modulation circuit and the pulse-width modulation circuit; wherein the pulse-amplitude modulation circuit of the third driver circuit is configured to control the amplitude of a third drive current based on the applied pulse-amplitude modulation data voltage Vdata_PAM, and the pulse-width modulation circuit of the third driver circuit is configured to control the pulse width of the third drive current based on the applied pulse-width modulation data voltage Vdata_PWM and the sweep signal V_SWEEP; and
    wherein the first driver circuit, the second driver circuit and the third driver circuit satisfy that $\Delta V\_SWEEP(1)/\Delta t\_SWEEP(1) < \Delta V\_SWEEP(2)/\Delta t\_SWEEP(2) < \Delta V\_SWEEP(3)/\Delta t\_SWEEP(3)$;
    wherein $\Delta V\_SWEEP(1)/\Delta t\_SWEEP(1)$, $\Delta V\_SWEEP(2)/\Delta t\_SWEEP(2)$ and $\Delta V\_SWEEP(3)/\Delta t\_SWEEP(3)$ are a changing rate of the sweep signal V_SWEEP configured for the pulse-width modulation circuit in the first driver circuit with time, a changing rate of the sweep signal V_SWEEP configured for the pulse-width modulation circuit in the second driver circuit with time and a changing rate of the sweep signal V_SWEEP configured for the pulse-width modulation circuit in the third driver circuit with time, respectively.

10. The display panel according to claim 9, wherein the first driver circuit, the second driver circuit and the third driver circuit satisfy the following:

Δt_SWEEP (1)>Δt_SWEEP (2)>Δt_SWEEP (3) and Δt_SWEEP (1)−Δt_SWEEP (2)>Δt_SWEEP (2)−Δt_SWEEP (3);

wherein Δt_SWEEP (1), Δt_SWEEP (2) and Δt_SWEEP (3) are a duration within which the sweep signal V_SWEEP configured for the pulse-width modulation circuit in the first driver circuit changes, a duration within which the sweep signal V_SWEEP configured for the pulse-width modulation circuit in the second driver circuit changes and a duration within which the sweep signal V_SWEEP configured for the pulse-width modulation circuit in the third driver circuit changes, respectively.

11. The display panel according to claim 10, wherein the first light-emitting element is a red light-emitting element, the second light-emitting element is a green light-emitting element, and the third light-emitting element is a blue light-emitting element.

12. The display panel according to claim 1, wherein the pulse-amplitude modulation circuit is configured to be driven by a first power voltage VDD_PAM, and the pulse-width modulation circuit is configured to be driven by a second power voltage VDD_PWM;

wherein the first driver circuit and the second driver circuit satisfy that ΔV_SWEEP/Δt_SWEEP (1)<ΔV_SWEEP/Δt_SWEEP (2) and (Vdata_PAM (1)−VDD_PAM(1))^2>(Vdata_PAM (2)−VDD_PAM (2))^2; and wherein ΔV_SWEEP (1)/Δt_SWEEP (1) and ΔV_SWEEP (2)/Δt_SWEEP (2) are a changing rate of the sweep signal V_SWEEP configured for the pulse-width modulation circuit in the first driver circuit with time and a changing rate of the sweep signal V_SWEEP configured for the pulse-width modulation circuit in the second driver circuit with time, respectively, Vdata_PAM (1) and Vdata_PAM (2) are a pulse-amplitude modulation data voltage configured for the pulse-amplitude modulation circuit in the first driver circuit and a pulse-amplitude modulation data voltage configured for the pulse-amplitude modulation circuit in the second driver circuit, respectively, and VDD_PAM (1) and VDD_PAM (2) are a first power voltage configured for the pulse-amplitude modulation circuit in the first driver circuit and a first power voltage configured for the pulse-amplitude modulation circuit in the second driver circuit, respectively.

13. The display panel according to claim 1, wherein the sweep signal V_SWEEP is a ramp signal.

14. The display panel according to claim 1, wherein each of the pulse-amplitude modulation circuit and the pulse-width modulation circuit comprises an initialization unit, a data write unit, a threshold compensation unit, a light emission control unit, a storage capacitor and a drive transistor;

wherein the initialization unit is electrically connected between an initialization signal terminal and a first node and configured to provide an initialization signal from the initialization signal terminal to the first node at an initialization stage;

wherein the data write unit is electrically connected between a data signal terminal and a first electrode of the drive transistor, a gate of the drive transistor and a first plate of the storage capacitor are electrically connected to the first node; and the data write unit is configured to provide a data voltage signal from the data signal terminal to the first node through the drive transistor at a data write stage;

wherein the threshold compensation unit is electrically connected between a second electrode of the drive transistor and the first node and configured to provide a threshold voltage of the drive transistor to the first node for compensation;

wherein in the pulse-width modulation circuit, a second plate of the storage capacitor is electrically connected to a sweep signal terminal that receives the sweep signal V_SWEEP; the light emission control unit is electrically connected between a power signal terminal and the first node in the pulse-amplitude modulation circuit and configured to control, at a light emission stage, the drive transistor to generate a driving pulse; and the power signal terminal receives a second power voltage VDD_PWM, and the data signal terminal receives the applied pulse-width modulation data voltage Vdata_PWM; and wherein in the pulse-amplitude modulation circuit, a second plate of the storage capacitor is electrically connected to a power signal terminal that receives a first power voltage VDD_PAM; the light emission control unit is electrically connected between the power signal terminal and a light-emitting element and configured to control, at the light emission stage, the drive transistor to generate the first drive current or the second drive current which flows into the light-emitting element to drive the light-emitting element to emit light; and the data signal terminal receives the pulse-amplitude modulation data voltage Vdata_PAM.

15. The display panel according to claim 1, wherein a light-emitting area of the first light-emitting element is greater than a light-emitting area of the second light-emitting element.

16. A display device, comprising: a display panel according to claim 1.

17. A display panel, comprising:

a first light-emitting element and a second light-emitting element; and a first driver circuit and a second driver circuit; wherein the first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light;

wherein each of the first driver circuit and the second driver circuit comprises a pulse-amplitude modulation circuit and a pulse-width modulation circuit;

wherein the pulse-amplitude modulation circuit of the first driver circuit is configured to control an amplitude of the first drive current based on an applied pulse-amplitude modulation data voltage Vdata_PAM, and the pulse-width modulation circuit of the first driver circuit is configured to control a pulse width of the first drive current based on an applied pulse-width modulation data voltage Vdata_PWM and a sweep signal V_SWEEP; the pulse-amplitude modulation circuit of the second driver circuit is configured to control an amplitude of the second drive current based on an applied pulse-amplitude modulation data voltage Vdata_PAM, and the pulse-width modulation circuit of the second driver circuit is configured to control a pulse width of the second drive current based on an applied pulse-width modulation data voltage Vdata_PWM and a sweep signal V_SWEEP, wherein the pulse-amplitude modulation circuit in the first driver circuit is configured with a pulse-amplitude modulation data voltage Vdata_PAM (1) and the pulse-amplitude modulation circuit in the second driver circuit is configured with a pulse-amplitude modulation data voltage Vdata_PAM (2), wherein the pulse-amplitude modulation circuit is configured to be driven by a first power voltage VDD_PAM, and the pulse-width modulation circuit is configured to be driven by a second power voltage VDD_PWM;

wherein the first driver circuit and the second driver circuit satisfy that (Vdata_PAM (1)−VDD_PAM(1))^2>(Vdata_PAM (2)−VDD_PAM(2))^2; and wherein VDD_PAM (1) and VDD_PAM (2) are a first power voltage configured for the pulse-amplitude modulation circuit in the first driver circuit and a first power voltage configured for the pulse-amplitude modulation circuit in the second driver circuit, respectively.

18. A display panel, comprising:
a first light-emitting element and a second light-emitting element, wherein the first light-emitting element and the second light-emitting element emit light in different colors; and
a first driver circuit and a second driver circuit; wherein the first driver circuit is electrically connected to the first light-emitting element and configured to provide a first drive current to the first light-emitting element to control the first light-emitting element to emit light, and the second driver circuit is electrically connected to the second light-emitting element and configured to provide a second drive current to the second light-emitting element to control the second light-emitting element to emit light;

wherein each of the first driver circuit and the second driver circuit comprises a pulse-amplitude modulation circuit and a pulse-width modulation circuit;

wherein the pulse-amplitude modulation circuit of the first driver circuit is configured to control an amplitude of the first drive current based on an applied pulse-amplitude modulation data voltage Vdata_PAM, and the pulse-width modulation circuit of the first driver circuit is configured to control a pulse width of the first drive current based on an applied pulse-width modulation data voltage Vdata_PWM and a sweep signal V_SWEEP; the pulse-amplitude modulation circuit of the second driver circuit is configured to control an amplitude of the second drive current based on an applied pulse-amplitude modulation data voltage Vdata_PAM, and the pulse-width modulation circuit of the second driver circuit is configured to control a pulse width of the second drive current based on an applied pulse-width modulation data voltage Vdata_PWM and a sweep signal V_SWEEP, wherein at least at a maximum grayscale, the pulse-amplitude modulation circuit in the first driver circuit is configured with a pulse-amplitude modulation data voltage Vdata_PAM (1) and the pulse-amplitude modulation circuit in the second driver circuit is configured with a pulse-amplitude modulation data voltage Vdata_PAM (2), and Vdata_PAM (1) and Vdata_PAM (2) are different.

* * * * *